(12) United States Patent  
Huang

(10) Patent No.: US 7,958,010 B2
(45) Date of Patent: Jun. 7, 2011

(54) INTERNET SEARCH ENGINE WITH CRITIC RATINGS

(76) Inventor: Ian Tzeung Huang, Calgary (CA)

( * ) Notice: Subject to any disclaimer, the term of this patent is extended or adjusted under 35 U.S.C. 154(b) by 1399 days.

(21) Appl. No.: 11/448,915

(22) Filed: Jun. 8, 2006

(65) Prior Publication Data

US 2006/0282336 A1    Dec. 14, 2006

(51) Int. Cl.
*G06Q 30/00* (2006.01)
(52) U.S. Cl. .......................................... 705/26
(58) Field of Classification Search ............... 705/26, 705/27

See application file for complete search history.

(56) References Cited

U.S. PATENT DOCUMENTS

| | | | |
|---|---|---|---|
| 5,983,214 A | 11/1999 | Lang et al. | |
| 6,078,866 A | 6/2000 | Buck et al. | |
| 6,493,702 B1 | 12/2002 | Adar et al. | |
| 6,873,982 B1 | 3/2005 | Bates et al. | |
| 7,024,405 B2 | 4/2006 | Salerno et al. | |
| 7,747,680 B2 * | 6/2010 | Ravikumar et al. | 709/203 |
| 2002/0046203 A1 | 4/2002 | Siegel et al. | |
| 2002/0107747 A1 * | 8/2002 | Gerogianni | 705/26 |
| 2003/0009570 A1 * | 1/2003 | Moskowitz et al. | 709/229 |
| 2005/0050022 A1 * | 3/2005 | Dukes et al. | 707/3 |
| 2005/0080771 A1 | 4/2005 | Fish | |

FOREIGN PATENT DOCUMENTS

| | | |
|---|---|---|
| GB | 01307210.3 | 3/2003 |
| WO | WO 0077689 A1 | 12/2000 |
| WO | PCT/US01/23393 | 7/2001 |
| WO | WO 01/50347 A1 | 7/2001 |
| WO | PCT/US03/23046 | 7/2003 |
| WO | PCT/US03/28323 | 9/2003 |
| WO | WO/2005/029368 | 3/2005 |

OTHER PUBLICATIONS

U.S. Appl. No. 10/004,514, Elkan.

* cited by examiner

*Primary Examiner* — Mila Airapetian

(57) ABSTRACT

The present invention provides an internet search engine and associated website which provides users with ranked website search results. In an aspect of the present invention, the search engine and associated website provides a critical rating function. Critics can be human experts who review websites on the internet and rate and comment on them. Users apply to become critics, and their applications are reviewed for acceptability by other critics. Critics are selected in particular professions for their expertise in those areas. The critics provide a rating and comments in relation to a site, or to other online content, including text, audio and video, among other things. Ratings and comments are also available to users. In other words, the present invention provides for at least two levels of critical review: critics' review and users' review. In an aspect of the present invention, an advanced critic sorting mechanism is provided.

22 Claims, 17 Drawing Sheets

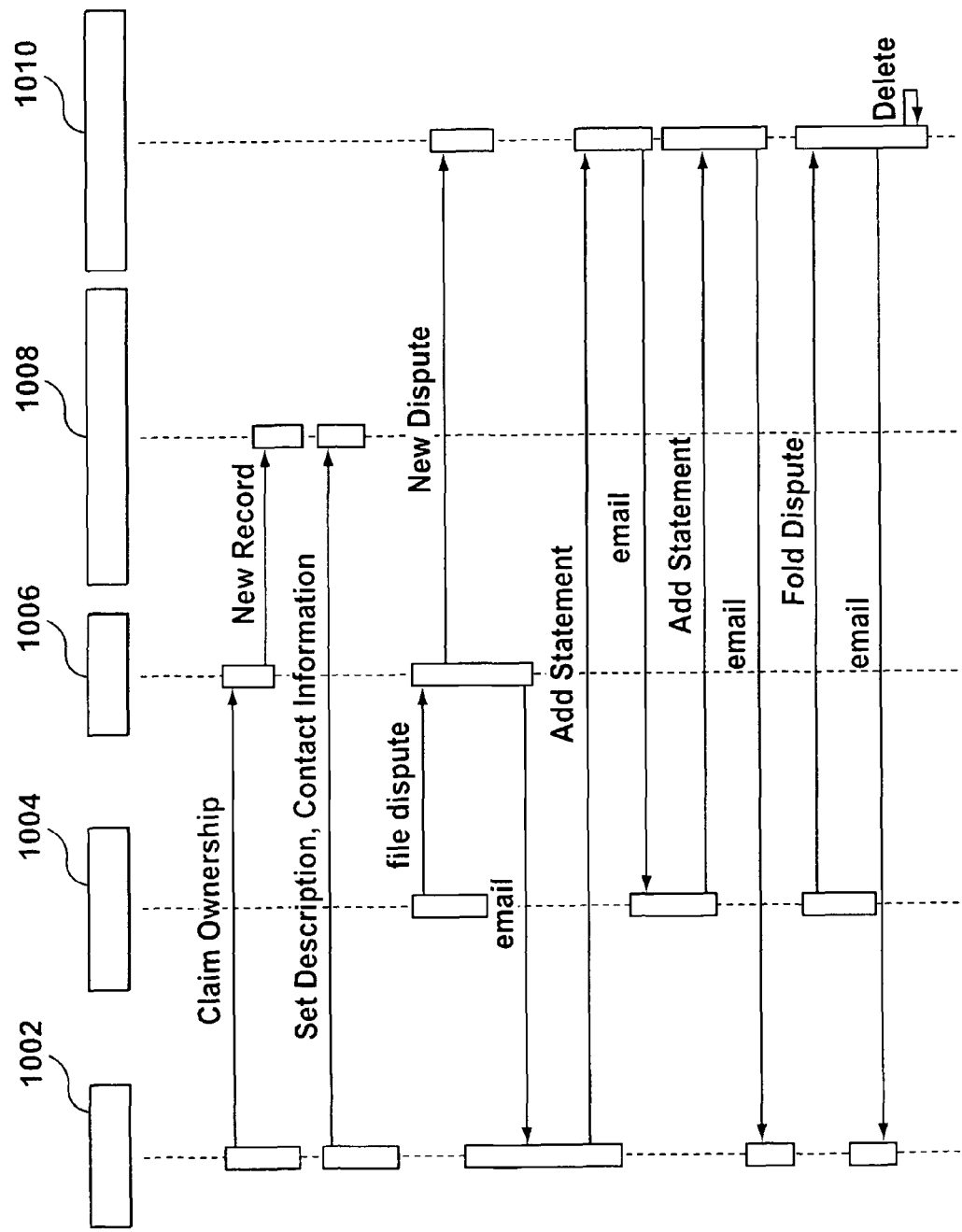

INTERNET SEARCH ENGINE WITH CRITIC RATINGS

FIELD OF THE INVENTION

The present invention relates generally to internet search engines. The present invention more particularly relates to an internet search engine featuring critical reviews and ranking of websites, and particularly the ranking of websites by human users and critics.

BACKGROUND OF THE INVENTION

The internet has become an indispensable information tool. However, the abundance of information available as websites through the internet is of limited use if it is not classified and ranked in a manner which is useful to a particular user. The internet traditionally requires the user to provide the judgment necessary to elicit useful information from the totality of information available through an internet search.

There has been a considerable amount of research in the area of searching, including searching that comprises ranking or review feature. For example, U.S. Patent Application No. 2002/0046203 to Siegel et al. teaches an internet search engine system which ranks results based on ranking of the research results by independent reviewers. The user may specify the type of review whose critical reviews are of interest for a particular search. However, the system lacks a formal process to validate and verify the credentials and claims of each registered user, and the rating system requires reliance on a third-party search engine.

PCT Patent Application No. PCT/NL00/00966 to Vennemann et al. describes a method of collecting and supplying information to a searcher by computer means. According to the method taught, information is collected in response to a search request. The search results are reviewed by experts before presentation to the searcher in a structured order. However, the collected information is limited according to the predetermined expert criteria.

PCT Patent Application No. PCT/US2003/023046 to Petras et al. describes a system for collecting users'opinions with respect to database contents such as internet search results, and permitting selection of search results screened according to such user opinions.

U.S. Pat. No. 5,983,214 to Lang et al. teaches an internet search engine system which filters search results by a relevancy ranking on the basis of evaluation by other internet users who have previously considered the results of the internet search. Like many other approaches, the system proposed in this patent considers every user as equals.

Further, PCT Patent Application No. PCT/US2004/030028 to Curtiss et al. (U.S. Application No. 2005/0060312) describes a method for ranking results, including determining one or more metric values for a news source. The system proposed in this patent application proposes multiple ways to take measurements of a specific news source. However, the metrics focus more on the magnitude and size of the news source compared to the quality of the stories produced by the source. Thus the process could place a bias towards the more established and used news sources, regardless of the quality of the articles written by the source. Although human opinion is referred to as a factor in the proposed rankings, given the number of other metrics proposed in the patent application, human opinion would likely be a small factor.

What is needed is an internet search engine and associated website capable of providing results ranked according to multiple criteria, including ratings by human critics having expertise in addition to ratings by ordinary users.

SUMMARY OF THE INVENTION

The present invention provides an internet search engine and associated website which provides users with ranked website search results.

The ranking is calculated according to an algorithm which incorporates multiple elements, including the positioning and frequency of keywords in the websites, the quantity of external links to other websites, the rating assigned to the websites by ordinary users and by critics, the quantity and currency of visits a website has received, the quantity of spamming techniques used by the websites, the similarity of a search word or phrase to the content of the search items, the date the search items were last uploaded or updated, the number of times a user or critic has clicked on the search item, the critic rating automatically given to search items with a high similarity rating and additional criteria selectable by a user. Preferably, the search engine interface provides a user with various icons adjacent to each individual "hit".

In an aspect of the present invention, the search engine and associated website provides a critical rating function. Critics can be human experts who review websites on the internet and rate and comment on them. Users apply to become critics, and their applications are reviewed for acceptability by other critics. Critics are selected in particular professions for their expertise in those areas.

Preferably, registration is required to become a user. Registered users in turn can then apply to be a critic.

The critics provide a rating and comments in relation to a site. Ratings and comments are also available to users. In other words, the present invention provides for at least two levels of critical review: critics' review and users' review. The critics review the originality, accuracy, general appeal and applicability of a website to assign each website an overall rating, and assign each website more than one detailed ratings. One aspect of the rating include the rating of the applicability of the site to certain keywords or tags. The critics and their ratings may themselves be criticized by other critics and users, and thereby rated and/or ranked. The follow-up ratings and comments from users and critics also provide an interactive discussion of the sites and the critics ratings and comments.

Critic ratings are applied to other websites, which may not have been rated by a particular critic, on the basis of the similarity of content of such other website to the content of websites which have been rated. Ratings are weighted, with critic ratings being assigned greater weight than ordinary user ratings, frequent critics and users being assigned greater weight than less frequent critics and users, and highly rated critics being assigned greater weight than less highly rated critics.

In one aspect, the present invention enables critical reviews and user reviews to be applied to variety of online content. Critics and users can critique, suggest, recommend or unload new online content. Content may include text, including essays, books and other literary works; audio, including recorded music, news and speeches; video, including movies, karaoke, television shows and concerts; multimedia, including software, games, presentations and educational resources; and physical media, including merchandise, pictures, images, shopping, travel, lodgings, real estate, maps, locations and sites on maps, and artistic works. Critics can be human critics who review content and rate and comment on it.

In an aspect of the present invention, an advanced critic sorting mechanism is provided. In one particular embodiment, an application from a user to become a critic is sent to other critics for approval. In this process, critics are required to reach a 50% approval subject to quorum in order to approve a particular user's request to become a critic, for example. Similarly, a user's status as an critic can be revoked or questioned if that particular critic's feedback is low, which maintains the integrity of the critics on a continuous basis.

In another aspect of the present invention, groups of users and critics can be created comprising users having particular expertise or other commonalities. For example, critic groups concerning a specific profession can be created. Preferably, critics may only rate search items within their particular area of expertise or profession.

In another aspect of the present invention, the search engine and associated websites and contents comprise an ownership feature. Owners of website may set up a record of ownership of their websites indexed using the present invention. They may display a description of their website, contact information, relevant business or personal profiles, related websites, critics and users' ratings and comments, and other relevant information on the website. The present invention includes a means for dispute resolution in the event that two users have a conflict over ownership of an indexed website. This ownership information is applicable to a variety of content.

The business or personal profiles may interact with users by way of messaging, blogging, forum, chatting, messaging and emailing, and the like.

In another aspect of the present invention, the search engine and associated website comprises an advice, questions and answers, including suggestions and collaboration feature.

In another aspect of the present invention, the search engine and associated website comprises a project development feature.

In another aspect of the present invention, the search engine comprises a posting of recipes and collaboration on recipes feature.

In another aspect of the present invention, the search engine and associated website is operable to allow users to establish personalized websites or modules, with access to each website or module dictated via a plurality of privacy settings. The modules may be developed modules or modules which the users create. The modules may be set to a plurality of privacy settings and can be shared between users.

In another aspect of the present invention, the search engine and associated website comprises a call for papers feature and repository for published or unpublished papers and articles.

The search engine and associated website may also be used to exchange a wide variety of content. Content may include text, including essays, books and other literary works; audio, including recorded music, news and speeches; video, including movies, karaoke, television shows and concerts; multimedia, including software, games, power point presentations and educational resources; and physical media, including merchandise, images, pictures, shopping, travel, lodgings, real estate, maps, locations and sites on maps, and artistic works.

In a further aspect of the present invention, the search engine and associated website comprises a news hosting feature.

In a further aspect of the present invention, the search engine and associated website comprises a schools and universities feature.

In a further aspect of the present invention, the search engine and associated website comprise a means for students and teachers to interact.

In a further aspect of the present invention, the search engine and associated website comprise a means for interactive gaming for users in remote locations.

In a yet further aspect of the present invention, an interactive health management system is provided.

BRIEF DESCRIPTION OF THE DRAWINGS

The invention will be described by reference to the preferred embodiment and the drawings thereof in which:

FIGS. 10a, 10b and 10c are sequence diagrams illustrating a dispute resolution aspect of the present invention.

Figure 1:
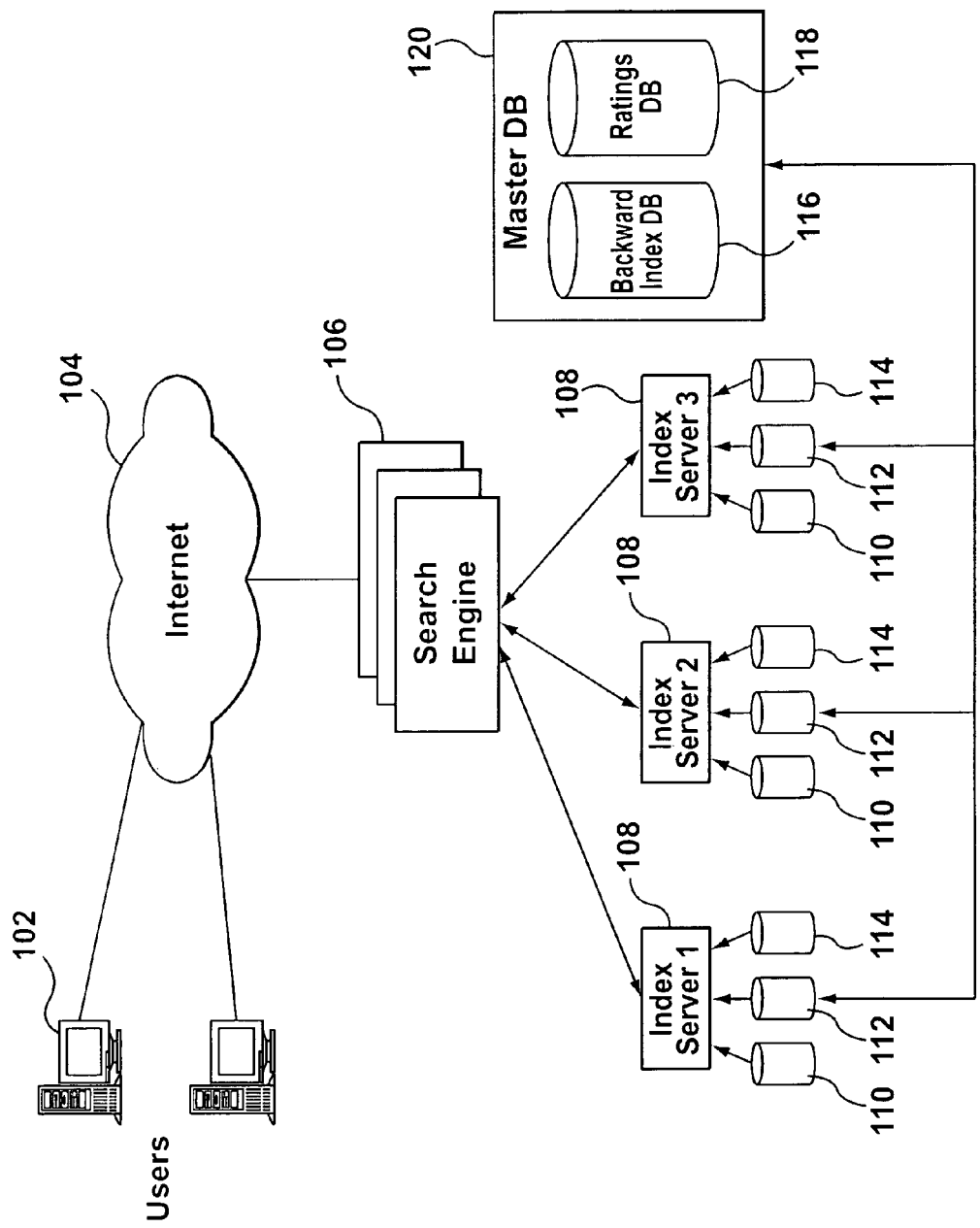
FIG. 1 illustrates a system for providing a search engine and associated website in accordance with the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

There is provided an Internet search engine and associated website which provides users with ranked website search results. The search engine uses critics and users to formulate the rankings.

In order to illustrate aspects of the present invention, an example of the architecture of a search engine system is provided in FIG. 1. In this example, users 102 are connected to the search engine 106 via the internet 104. The search engine 106 is supported by a plurality of index servers 108.

Each index server 108 comprises three databases: (i) a local critic/user rating database 110; (ii) a local backward index database 112; and (iii) a local action rank database 114. The local critic/user rating database 110, the local backward index database 112 and the local action rank database 114 are all synchronized to a master database 120. The master database 120 comprises the backward index database 116 and the ratings database 118. The ratings database 118 includes rankings from both the action rank and critic/user rank method, as described above.

Figure 2:
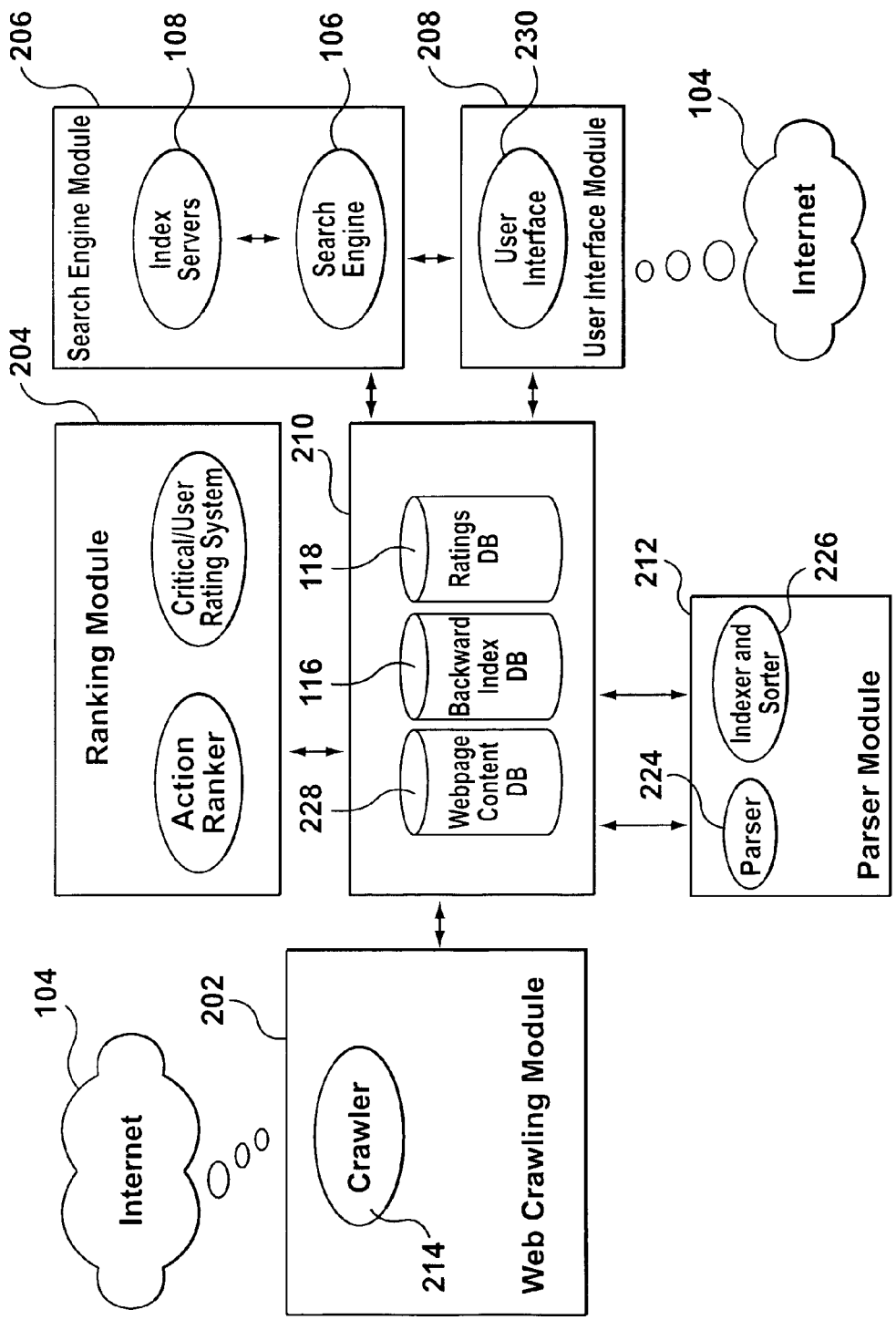
FIG. 2 further illustrates a system for providing a search engine and associated website in accordance with the present invention.

Further detail of the example arrangement is illustrated in FIG. 2. The system comprises a web crawling module 202, a ranking module 204, a database module 210, a parser module 212, a search engine module 206 and a user interface module 208.

A crawler 214 in the web crawling module 202 downloads webpages from the internet 104 and stores them to a webpage content database 228 in the database module 210. A parser 224 linked to an indexer and sorter 226 in the parser module 212 parses the webpages in the webpage content database 228 in database module 210 and generates a backward index database 116 in the database module 210. The ranking module 204 computes the action rank and collects and computes the critic/user rank using an actionranker 234 and critic/user rating system 236, respectively, as described above. The ranking module 204 provides this information to the ratings database 118 in the database module 210.

The user interface module 208 is connected to the internet 104 and comprises a user interface 230. The user interface module 208 is also connected to a search engine module 206. The search engine module 206 comprises the index servers 108 and the search engine 106. Both the user interface module 208 and the search engine module 206 are operably connected to the database module 210 to provide ranked search results in accordance with the present invention.

Search Engine

In one embodiment, a search engine in accordance with the present invention comprises one or more of the following search options:

(i) Single Keyword Search—the search engine shall return all results that each result contains the keyword.

(ii) Multiple keywords search—the search engine shall return all results that each result contains all keywords.

(iii) Exclude keywords search—this option must be used together with either single or multiple keywords search. The search engine shall return all results that do not contain the exclusion keywords.

(iv) Category search—this option must be used together with either single or multiple keywords search. The search engine shall return all results that each result contains all keywords and each result has the same category as specified.

(v) Exact phrase search—The search engine shall return all results that each result contains the exact phase.

(vi) At least one of the words—the search engine shall return all results that contain at least one word. This option has to be used in conjunction with the single, multiple or exact phrase search.

(vii) Occurrences search—it allows the user to specify the search that is performed on specific web contents (e.g., uniform resource locator ("URL"), title or content). The search engine shall return all results that the web contents contain the search keywords.

(vii) Domain search—it allows the user to specify the domain to be search. The search engine shall return all results that the domain contains the search keywords.

Further, all combinations of the above search types are supported. The search engine provides an advanced algorithm to influence the ranking of the search results according to three separate criteria, discussed more fully below: (1) critics rating; (2) user rating; and (3) action rank.

Search Engine Database

The search engine database consists of set of predefined data set to support the above search engine features. The database is stored in the Index Server. In one embodiment of the present invention, the database is divided into three components:

A. Backward Index Database ("BI")

Figure 3:
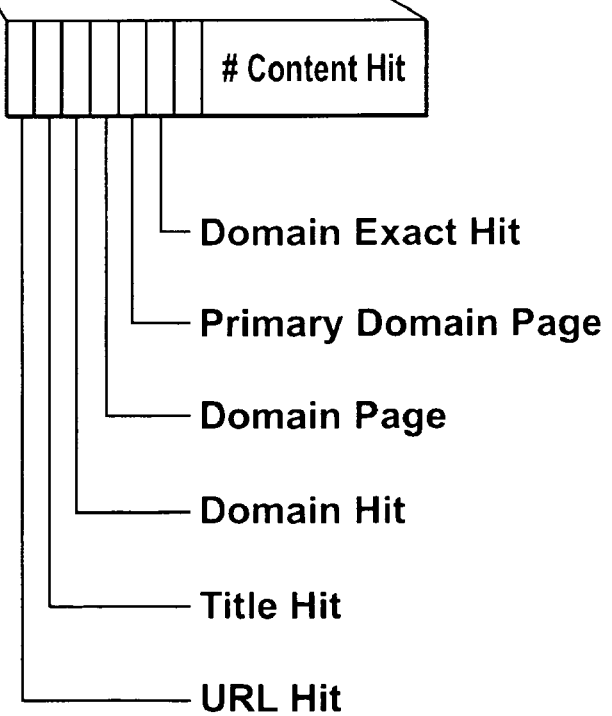
FIG. 3 illustrates the arrangement of a backward index in accordance with the present invention.

A representative illustration of a BI is shown in FIG. 3. A BI contains the backward index of all indexed URL pages, in a manner that is known. Each backward index contains a list of URL document numbers (docID) that contains the keyword.

Crawling searches are conducted in a manner that is known, including the following techniques:

(i) URL Hit (urlhit)—if the word appears in any position of the current URL, it is URL hit.

(ii) Title Hit (titlehit)—If the word appears in any position of the title, it is title hit.

(iii) Domain Hit (domainhit)—If the word appears in the domain of the current URL, it is domain hit.

(iv) Domain Page (domainpage)—If the current URL is a domain page (either primary or sub domain), all word hits in the current page will be marked as domain page hit.

(v) Primary Domain Page (primarydomainpage)—If the current URL is a primary domain page, all word hits in the current page will be marked as primary domain page hit.

(vi) Domain Exact Hit (domainexact)—If the word is exactly the domain name, it is a domain exact hit. It can be implemented as follows: during parsing, extract the domain from the URL, then add the domain as a word hit and set the Domain Exact Hit=Yes. Note that only one word is marked Domain Exact Hit=Yes in each page.

(vii) Number of Content Hits (numcontenthit)—Assesses the number of occurrences of the keyword in the ULR page.

B. Critic Rank Database

The critic rank database contains the critic ranking of all URL pages. Critic rank database is generated from the user/critic rating submitted from the search engine website. Each URL page is associated with a set of critic rank data to influence the search result.

C. Action Rank Database

The action rank database contains the page rank of all URL pages. Each URL page is associated with an action page rank to influence the search result.

Search Algorithm

In one embodiment of the present invention, the search algorithm is as follows:

(i) Upon receiving the search request, the index server shall search the BI and generate one search result list for each keyword (include exclude keywords). If the search request includes the category search, the search result shall only include those within the same category.

(ii) From the search result lists, select only the search result that appears in all search result lists and add to the intermediate search result list A. This can be realized by comparing the URL docID of each search result among the search result lists.

(iii) From the intermediate search result list A, remove all search results that have the URL docID in the exclude keywords search result lists. The resulting list B is the final search results.

(iv) Compute a relevant score for each search result in list B as follows:

For Single keyword search:

$$\text{Relevant score} = A*\text{URLhit} + B*\text{titlehit} + C*\text{domainhit} + D*\text{domainpage} + E*\text{primarydomainpage} + F*\text{domainexact} + G*\text{numcontenthit}$$

For Multiple keyword search:

$$\text{Relevant score} = \{A*\text{sum(all URL hit)} + B*\text{sum(all titlehit)} + C*\text{sum(all domainhit)} + D*\text{sum(all domainpage)} + E*\text{sum(all primarydomainpage)} + F*\text{sum(all domainexact)} + G*\text{sum(all numcontenthit)}\}/\#\text{ keywords}$$

where A to G are the weight factors. Note that there is threshold on maximum allowable number of content hit (v) Compute a overall score for each search result in list B as follows:

$$\text{Overall Score} = (X*\text{Critic Rank} + Y*\text{Action Rank})\text{Relevant score}$$

where X and Y are the system parameters.

Search result B will be sorted according to overall score, the top results being returned to the user.

The ranking is calculated according to an algorithm which incorporates multiple elements, including the positioning and frequency of keywords in the websites, the quantity of external links to other websites, the rating assigned to the websites by ordinary users and by critics, the quantity and currency of visits a website has received, the quantity of spamming techniques used by the websites, the similarity of a search word or phrase to the content of the search items, the date the search items were last uploaded or updated, the number of times a user or critic has clicked on the search item, the critic rating automatically given to search items with a high similarity rating and additional criteria selectable by a user.

The searched results of URLs are ranked by a category-based webpage ranking algorithm before sending back to the web server for displaying as the final searching result, referred to as "action rank".

Action rank is a category-based URL ranking of query result using a knowledge base. Essentially, the searched results of URLs are ranked by a category-based webpage ranking algorithm before sending back to the web server for displaying as the final searching result. A frame of representative basic categories is created before webpage ranking, in a manner that is known. The webpages being searched out are classified into different categories and filled into slots of this frame by a classifier.

A query is analyzed using the knowledge in a knowledge-base that is composed of a word dictionary, syntactic knowledge (the knowledge about how words are put together to form sentences or phase), semantic knowledge (the knowledge about how the meanings of words are combined to provide the meaning of sentence or phases), knowledge of word use situation, a representation of beliefs about intentions and a model of actions. The categories of webpages fit the query intentions are selected and ranked based on an overall ranking approach, which is computed through the pair-wise comparison algorithm using values of the webpages, the number of hits in a page, and the type of word hits of pages.

Critics

Human critics with diverse background and special expertise in all professions provide vital expertise in the judging of websites or other contents in their areas or professions of specialization. Human experts provide relevant ranking and comments on websites and other contents for the benefit of users. Human experts provide ranking and information to guide the users to pertinent and useful websites and content.

All human experts from around the world can participate by applying to become critics. This allows for unlimited multiplicity of human experts with diverse educational background and experiences to participate in giving useful ratings and comments. Thus, with the large numbers of human experts allowed to give ratings of a website or content, an accurate picture of the quality and relevance of a website or content is assured. This is an advantageous over the prior art, where experts are limited or chosen for rating website or content.

Preferably, only human experts with knowledge and background in a particular field can rate and comment on a site or content within their field of specialization or profession. This is advantageous because hitherto a limited number of human experts participate in rating or human users with diverse backgrounds participate in the judgement of a particular site not within their field of expertise or background.

Also, ratings and comments posted by critics are in turn evaluated by users and other critics. This allows for a check of the quality of the ratings and comments posted by the critics. The evaluation posted by users and other critics are in turn evaluated by users and other critics and so on down. This allows for fair and accurate evaluation of the critics. Critics whose quality of rating, comments and performance fall below the standard of their peers in a profession or specialization are identified. These critics are then evaluated by their peers or members of their society in a profession. Sanctions or penalties may then be imposed. This feedback mechanism encourages honesty and fairness in the evaluations posted by the critics and also a process of fair evaluation of the critics. This is advantageous vis-à-vis the prior art, where there may not be any evaluation of experts or there is not a fair or accurate feedback mechanism on the experts performance.

The follow-up ratings and comments from users and critics also provide an interactive discussion of the sites or content and the critics' ratings and comments.

Also the users and critics can participate in rewards programs which may or may not be linked to their participation in the evaluation of websites or contents. Any rewards to the users or critics may or may not involve the quantity and quality of their ratings and comments, and may also stem from their participation in other features such as answering questions posted by users.

In general, users look at sites or content from a different perspective compared to an expert or specialist. Ratings and comments by ordinary users provide divergent views on websites and other content. This may not be as useful as critic ratings and comments. Specialists judge the originality, accuracy, general appeal and applicability Or other features of a site or content based upon their specialized expertise and experience and also the applicability of a site or content to keywords or tags. The other features available for rating are dependent on the category of website covered in the page. For example, one may rate a hotel website on features such as food service and room quality.

In contrast with the prior art, the expert reviews provided by the present invention can be solicited from around the world, and people can qualify to become critics by submitting their qualification to their peers in the profession of their specialization. Please note that the terms critic and expert are used interchangeably herein.

In an aspect of the present invention, users apply to be critics. Potential critics must apply to a "manager" of the search engine and associated website in order to be designated a critic in a particular area or profession. In doing so, critics provide certain information, for example their expertise in a given field, in order to show their suitability as a critic. An application from a user to become a critic is sent to other critics for approval. For example, critics are required to reach a 50% approval subject to quorum in order to approve a particular user's request to become a critic. Similarly, a user's status as an critic can be revoked or questioned if that particular critic's feedback is low, which maintains the integrity of the critics on a continuous basis.

Figure 4:
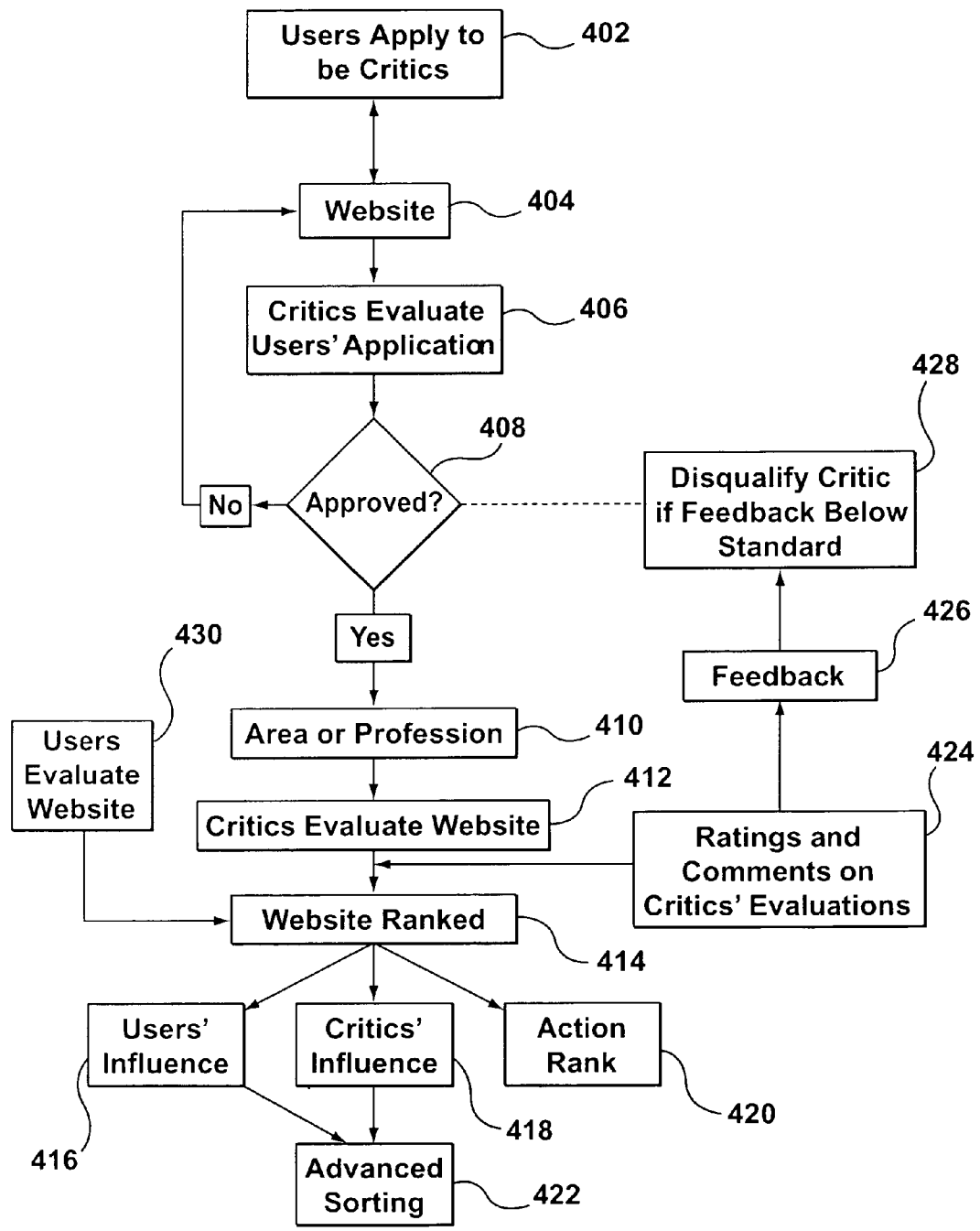
FIG. 4 illustrates a critic application and rating process for search engine results according to an aspect of the present invention.

The critical rating function of the search engine and associated website of the present invention is generally illustrated in FIG. 4. As stated above, critics are human experts who are selected to review websites and other content on the internet and rate and comment on them. Users apply 402 to a website 404 in accordance with the present invention to become critics, and their applications are reviewed for acceptability by other critics 406. The users' applications are subject to the approval by the critics 408. Generally, critics are selected in particular areas or professions for their expertise in those areas or professions. If a particular user's application is deemed acceptable by the critics, then the critic is accepted and optionally associated with a particular area or profession 410.

Once a user attains the status of critic, the critic is enabled to provide ratings and comments in relation to a website 412. Ratings and comments are available to the users as well 430. In other words, the present invention provides for at least two levels of critical review: critics' review and users' review. The critics and users each review the originality, accuracy, general appeal and applicability or other features of a website to assign each website with an overall rating, and/or assign each website more than one detailed ratings. One aspect of the rating includes the rating of the applicability of the site to certain keywords or tags. The other features available for rating are dependent on the category of website covered in the page. For example, one may rate a shopping website on features such as product quality, customer service, and price. Or, for example, one may rate a golf course website on features such as course conditions, playability, and clubhouse services. Users and critics can suggest, recommend or upload websites and may tag them with appropriate keywords.

The critics and their ratings may themselves be criticized by other critics and users 424, which in turn provide feedback 426 that can be used to disqualify a critic 428 if the feedback is unsatisfactory. Critics can be ranked as "top experts" or "top critics" based on different criteria, including, as examples, the number of websites critiqued, the number of views, or the specific ranking by the users. Users can then search for top critics in any particular field, on the basis of one or more criterion.

Further, top critics can be searched on the basis of geographical location, e.g., by postal code. Top critics can be displayed individually or in a group.

Critics' ratings are applied to other websites, which may not have been rated by a particular critic, on the basis of the similarity of content of such other website to the content of websites which have been rated. Ratings are weighted, with critic ratings being assigned greater weight than ordinary user ratings, frequent critics and users being assigned greater weight than less frequent critics and users, and highly rated critics being assigned greater weight than less highly rated critics. The users' influence 416, critics' influence 418 and the action rank 420 are all factors which influence the results of any search conducted on the search engine. Advanced sorting 422 can also be implemented, e.g., sorting of critics' ratings by a particular profession.

The present invention also provides an internet search engine and associated website which provides users with ranked content search results. The critical reviews and user reviews may be applied to variety of content, comprising text, including essays, books and other literary works; audio, including recorded music, news and speeches; video, including movies, karaoke, television shows and concerts; multimedia, including software, games, presentations and educational resources; and physical media, including merchandise, pictures, images, shopping, travel, lodgings, real estate, maps, locations and sites on maps, and artistic works.

Figure 5:
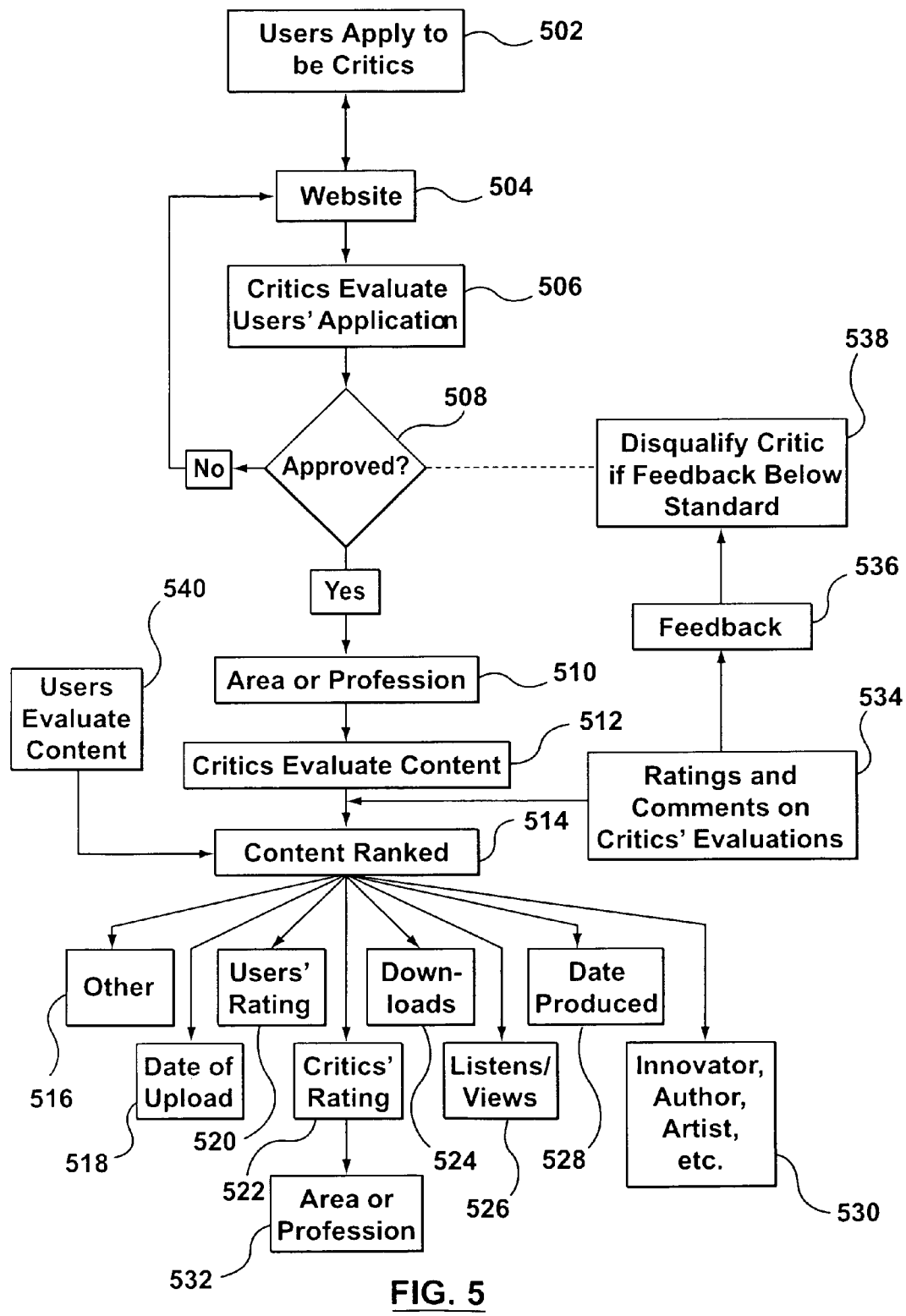
FIG. 5 illustrates a critic application and rating process for content according to an aspect of the present invention.

FIG. 5 generally illustrates the manner in which critics provide a rating and comments in relation to content. Similar to FIG. 4, users apply 502 to a website 504 to become critics. Their applications are reviewed for acceptability by other critics 506, and are subject to their approval 508. If a particular user's application is deemed acceptable by the critics, then the critic is accepted and optionally associated with a particular area or profession 510.

Once a user attains the status of critic, the critic is able to provide ratings and comments in relation to content 512. Ratings and comments are also provided by users 530 in association with the content. The critics and users review the content and provide ratings and comments. The critics and their ratings may themselves be criticized by other critics and users 534, which in turn may provide feedback 536 that can be used to disqualify a critic 538 if the feedback is unsatisfactory.

The critics' evaluation 512 and the users' evaluation 540 inform the ranking of the content as provided by the search engine. The rankings can then be sorted by further means, e.g., by date of upload 518, by users' ratings 520, by critics' ratings 522, by number of downloads 524, by number of listens and/or views 526, by date produced 528, by the innovator/author/artist, etc. 530, or by other features attributed to the content in question 516. The rankings can be further sorted by critics' ratings of a particular profession 532.

The search engine and associated website of the present invention also provides an advanced sorting mechanism for sorting critics and users alike.

In addition, a user may be required to have a minimum number of ratings of other websites or contents in order to qualify to become a critic. In this way, other critics are able to look at his/her ratings and comments of sites or contents he/she has critiqued so that they can decide how well he/she acts as a critic.

Critics should only rate search items which are sufficiently similar to their approved critic groups. These groups are dynamically created based on words and phrases that are similar to each other or by professions. If approved to be a critic, they may contribute ratings and comments on websites or content.

Preferably, ratings and comments posted by critics are in turn evaluated by users and other critics. This allows for a check of the quality of the ratings and comments posted by the critics. The evaluation posted by users and other critics are in turn evaluated by users and other critics and so on down.

For example, this allows for calculation of the mean "follow-up rating" by implementing the following algorithm into a function, in a manner that is known.

(i) This function involves a recursive average of all follow-ups applicable to the root user or critic rating.

(ii) Given a user or critic rating identified as comment-identifier, find the mean follow-up rating for such comment.

(iii) RETURN VALUE: If a rating has no follow-ups, then a null value is returned. Otherwise, an ordered pair of (meanRating, ratingCount) will be returned.

(iv) The mean Rating is on a scale of 0 to 5 with zero being the lowest rating and 5 being the highest.

How the algorithm for mean "follow-up rating" works is as follows:

(i) If no follow-ups can be identified for a specific comment identifier, the result is null.

(ii) The mean ratings of all follow-ups found at this level is averaged.

(iii) For each follow-up, the mean rating of any follow-ups tied to such follow-up is averaged.

(iv) If a specific follow-up rating shows a rating of 2 or less (a negative rating), any follow-ups tied to this rating are counted towards the mean follow-up rating as 5 less such rating.

In this way, any agreements (3 or higher) with the low rating will be interpreted as a low rating on the root critic or user. Any disagreements (2 or less) would be interpreted as a disagreement on a low rating and thus should be regarded as a positive rating on the root critic or user. If a specific follow-up rating shows a rating of 3 or more (a positive rating), any follow-ups tied to this rating are counted toward the mean follow-up rating as the same as the rating assigned. In this way, any agreements (3 or higher) would be an agreement with the root critic or user. Similarly, any disagreements (2 or less) would be a disagreement with the root critic or user.

Calculating a follow-up rating in this manner, allows for fair and accurate evaluation of the critics. Critics whose quality of rating, comments and performance fall below the standard of their peers in a profession or specialization are identified by the following means:

(i) As per a follow-up on critic follow-up ratings, the following standard statistical test can be used in determining if a critic is not performing within par.

(ii) Assuming a normal or parametric critic behaviour, the mean critic follow-up rating will have a normal distribution with:

MEAN: Each critic will have a mean follow-up rating, or NONE if he or she has not been followed up. The mean follow-up rating is the average of all follow-up ratings over all use/critic ratings applicable for this user. It can be computed only on critic ratings, user ratings, or both. Critics with NONE as a mean follow-up rating cannot be counted.

STANDARD DEVIATION: There will be a standard deviation of the critic's mean rating, calculated using normal standard deviation formulae.

(iii) The null hypothesis in this situation is that the critic does not have a poor rating (his average rating is meaningfully equal to the population average). This is tested against the alternative that the critic does (his average rating is noticeably lower than the population average) and should be sanctioned.

(iv) The test statistic is:

$$Z=\{(\text{This critic's average follow-up rating})-(\text{mean critic's average follow-up rating})\}/\text{standard deviation}$$

(v) The probability of a type-one error (sanctioning a critic that should not be sanctioned) should be at least 1% but no more than 5%.

(vi) If Z is less than Z-alpha where P(Z<Z-alpha)=0.05 then the null hypothesis is rejected and conclude the critic is a likely candidate for sanctioning.

In this manner, critics are evaluated by their peers or members within their group or profession. Sanctions or penalties may then be imposed for substandard performance. For example, underperforming critics may lose their critic status. This feedback mechanism encourages honesty and fairness in the evaluations posted by the critics and also a process of fair evaluation of the critics.

Figure 6:
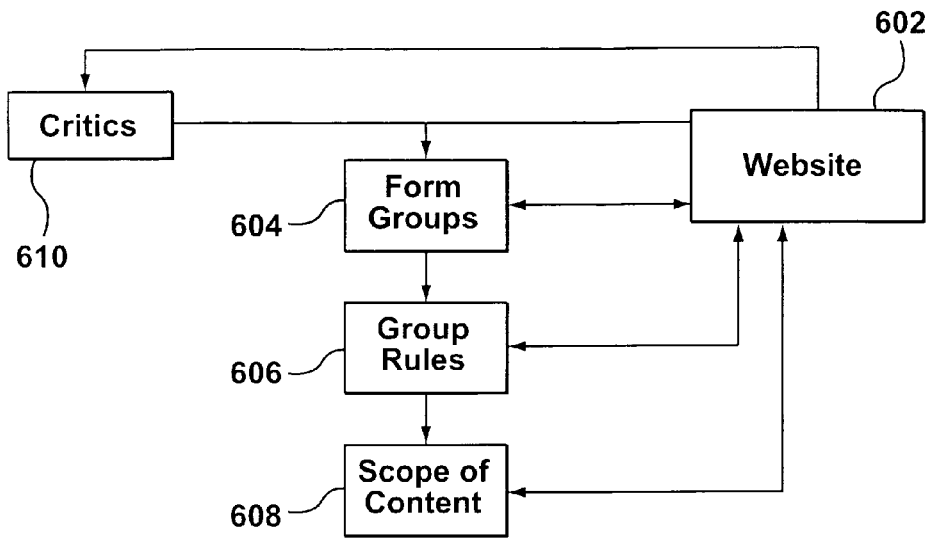
FIG. 6 illustrates a critics' professional society feature in accordance with an aspect of the present invention.

As illustrated in FIG. 6, critics can form groups based on the expertise or other commonalities between individual critics. For example, these groups can serve as a professional society wherein critic members all hail from the same particular field, e.g., doctors, lawyers, architects etc. In this regard, the website in accordance with the present invention 602 allows the approved critics 610 to form particular groups 604. For example, a professional society can be created particularly for cardiologists. The cardiologists can form a group with a particular mandate to, e.g., review and comment on various food websites in order to allow people to learn about food choices and the links with heart disease.

Within each group, different critics can be elected or nominated to serve particular roles, e.g., president, vice-president, treasurer, etc., to determine and implement various group rules 606 deemed necessary for the governance of the group. The group members are also able to outline and define and the scope 608 of the websites or content open to the group to evaluate, rate or provide comments on. In doing so, the governing members of the group can monitor the performance of each individual critic to determine whether they, for example, are productive enough to maintain their status within the group.

In addition, skilled criticism by critics or users may be recognized through reward programs by the manager of the search engine and associated website. The critics and users can participate in rewards programs which may or may not be linked to their participation in the evaluation of websites or content. Rewards to the users and critics do not necessarily involve the quantity and quality of their ratings and comments, but can come in their participation in other features such as answering questions posted by users. Highly rated websites and content may also be recognized through reward programs.

Alternatively, websites and content can be searched on the basis that they are not yet ranked, allowing a user or critic the opportunity to be the first one to critically rank a website or content. Users and critics can recommend websites or contents based on keyword(s) or tag(s) searched. Users and critics can upload websites or contents for inclusion in the search engine.

The search engine and website may operate in numerous languages.

In operation, a user will enter one or more keywords into the search engine and associated website of the present invention. The retrieved results may be ordered according to one or more of several ordering criteria. The ordering criteria include action rank, critic rating or influence, user rating or influence, combination of critic and user rating or influence, date of upload of the website and number of visits or recommendations a website or content has received.

Further detailed ratings can be provided for each of the retrieved results. For example, the results can be ranked in terms of ease of use, whether there are supportive illustrations, the relevance to the search theme, the accuracy of content and other relevant factors. If more than one critic rates the site, the average ratings of each of the detailed ratings can be displayed.

In one embodiment of the present invention, a critic's profile can be set separate from his/her regular user profile or dating profile. There can be both an "About Me" section and a "Professional Biography" section.

Projects

According to one particular aspect, the search engine and website of the present invention may be used to host the development of projects and collaboration on projects, and allow project tenders. Bidders may access the website to bid on tenders.

Figure 7:
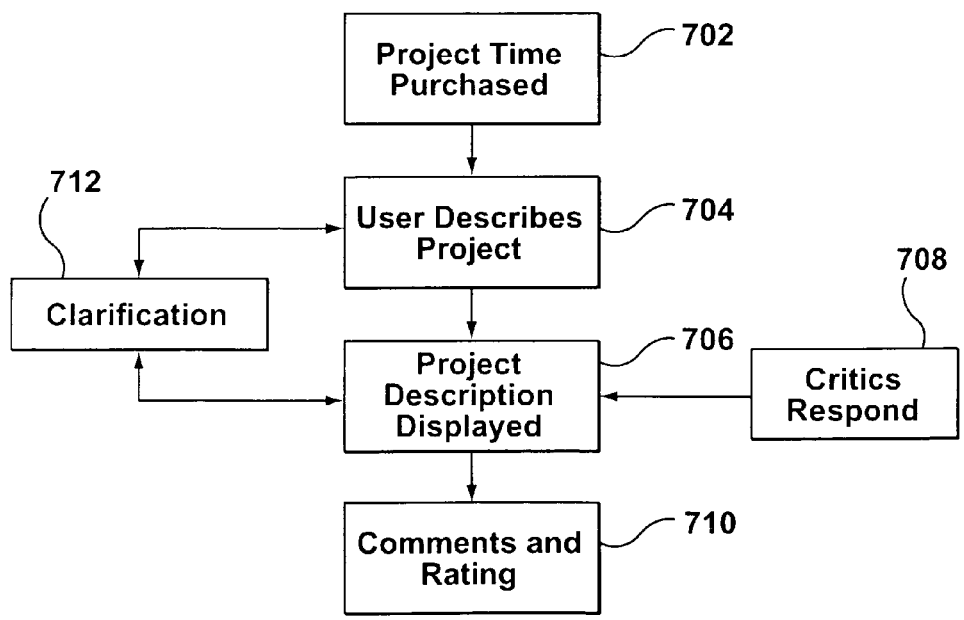
FIG. 7 illustrates a project feature in accordance with an aspect of the present invention.

As an example, as illustrated in FIG. 7, a user can purchase time to post a project 702. This is like purchasing online advertising time, with the price proportional to the amount of time to be posted. A user then provides a general description of the project 704, and lists how much the value of the project is, or alternatively requests an open bid. In order to elicit responses from critics with particular expertise, the user selects the area or profession the project is in. As well, the user may select the privacy setting (i.e. the selection of people open to help on the project, e.g., private, public, or semi-private within a certain group of critics). The project description is then displayed 706, and critics are able to respond 708 by placing bids or otherwise. Other non-critic users can apply to participate in the project if the project is non-private. The project owner and all respondents can negotiate the value for particular project. Clarification 712 of the project and collaboration are allowed. Comments and ratings 710 are provided so that the participants can provide feedback as to how the interaction went. A search function for projects by categories, professions or keywords may also be available.

Collaboration and Question & Answer ("Q&A")

The search engine and associated website of the present invention also comprises collaboration and question and answer features.

Figure 8:
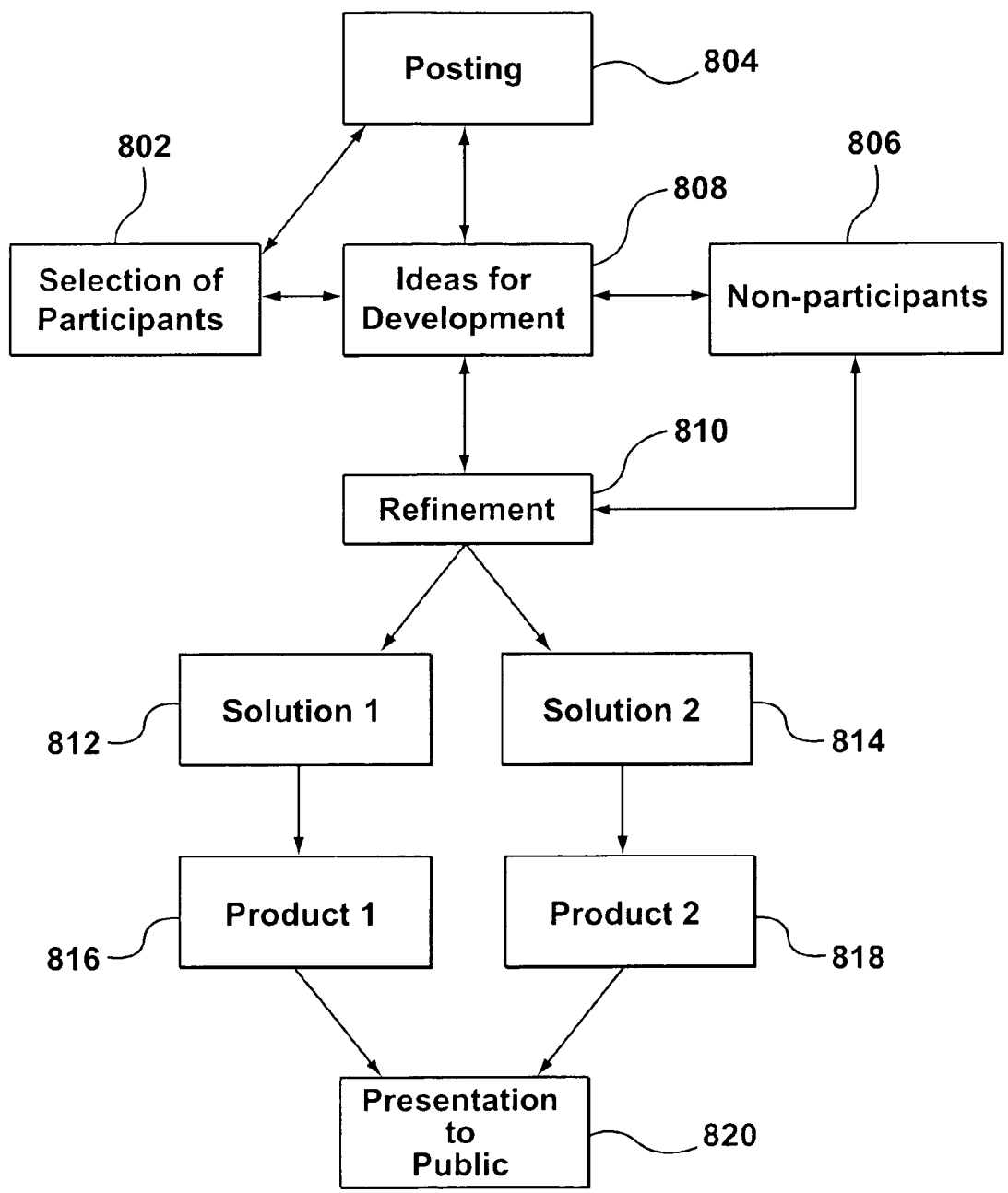
FIG. 8 illustrates a collaboration feature in accordance with an aspect of the present invention.

In one aspect, users are able to request collaboration from other users and/or critics, as illustrated in FIG. 8. In this regard, users post a request 804 to initiate collaboration. In doing so, the user selects the participants 802, e.g., by selecting particular professional groups, or alternatively leaving it open for all users and critics to apply to collaborate. The ideas are then tabled for development 808. For example, in the medical field, a user may request collaboration with respect to data for algorithms for systems-based workup or disease description. During this time, non-participants 806 in the collaboration (including critics and non-critics alike) are able to provide comments and in particular test the concepts and ideas as they are being developed and refined. The ideas are subject to refinement 810 until the collaboration yields particular solutions 812, 814. These solutions can then take the form of products 816, 818 and then presented to the public 820.

Figure 9:
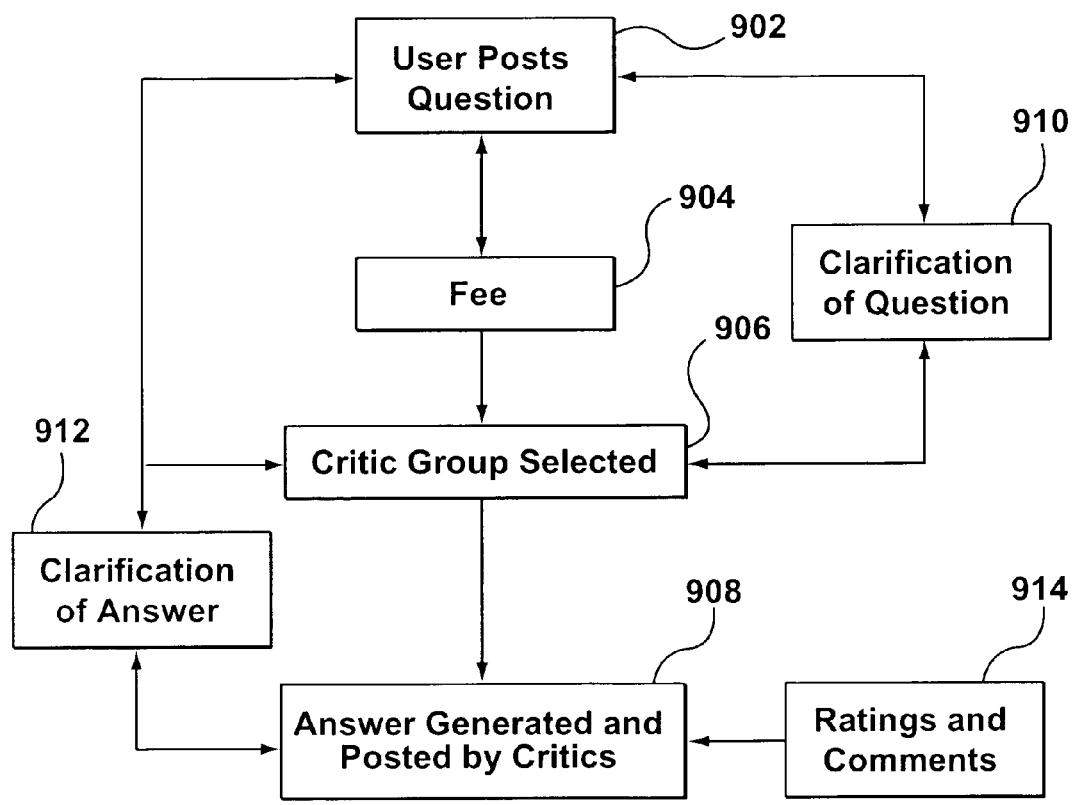
FIG. 9 illustrates an advice and Q&A feature in accordance with an aspect of the present invention.

Similarly, users can initiate a Q&A session, as illustrated in FIG. 9. Preferably, this is configured so that only critics can respond to questions posed by the users. A user posts a question 902. Upon payment of a fee charged for posting the question 904, a critic group is selected 906 with expertise relevant to the question posed. For example, the user can choose a profession or professions to get answers from or he can choose a specific critic. Where required, the critics can prompt the user to clarify the question 910. Critics can then post an answer to the question 908. The user is able to prompt the critics for clarification of the answer 912.

The user can also choose to have one or more answers. It is possible for users to set prices and pay to choose from the list of critics who offer services. When an answer is registered, the question is "locked out", that is no additional answers can be posted unless he specifies he wants more than one answers. He has to specify how much he wants to pay for each additional answer. It can be up to the user to determine whether the request is in public view or private view only. In addition to the fees, critics can be provided with a royalty, providing an incentive to become an established critic. Ratings and comments 914 are provided by the user who posed the question, by other users, by the critics who answered the question, or by other critics. A search function for questions and answers by categories, professions or keywords may be provided.

Another aspect of Q&A allows users to pose questions to other users. Preferably, there are no fees payable for answers from regular users or the public. The questions posed can be in text and/or image form. The answers can be in text and/or image form. The user can choose to have one or more answers. When an answer is registered, the question is locked out, that is no additional answers can be posted unless he specifies he wants more than one answers. It can be up to the user to determine whether the request is in public view or private view only. Clarification of the questions or answers is allowed. Ratings and comments are provided by the user and by the public on the answers. A search function for questions and answers by categories, professions or keywords is available.

Recipes

In another aspect of the present invention, the search engine comprises posting of recipes and collaboration on recipes feature. In accordance with this aspect, a user can post recipes and ask for advice or collaboration on recipes. Clarification of the advice or collaboration is allowed. Ratings and comments are provided by the critics and the public on recipes. A search function for recipes by categories, or keywords is available.

Site Information

In an aspect of the present invention, users of the search engine and associated website can access a dedicated information page on the website that hosts each search result.

When a search result is output to the browser, the web host name is extrapolated from the URL of the search result. A link is made to a generated information page for the host name and presented beside each search result.

The contents of the information page include ownership information as well as current user and critic ratings issued on pages hosted by the hostname.

If a site is not owned, there will be a link to an application for ownership of the site. If a site is owned, the owner's public display name and cover photo are shown, with one-click access to the public profile of the owner, as well as a list of sub-profiles assigned to the site. Each sub-profile is hyperlinked to the users' public profile. There is also a link to apply for a dispute on the ownership of this site if the current user logged in is not the owner. If there is an outstanding dispute on the ownership, ownership is shown as the current owner, however it is mentioned that a dispute is in progress. No details on the dispute are shown except to those involved in the dispute.

The information page also contains a list of pages that have been rated by registered users and critics. The listing includes title, URL, average critic rating and average user rating. The ratings are hyperlinked to detailed ratings for each page. Users reading the ratings can issue follow-up ratings on the ratings issued.

The information page also contains a partially completed search form designed to perform a search on pages restricted to the site covered in the information page.

Ownership of Webpages

In an aspect of the present invention, users of the search engine and associated website are able to claim ownership of any website or project indexed within the present invention that he/she legitimately owns. Information regarding the ownership of the website is available for public viewing.

If a registered user's website has been crawled and indexed within the present invention, then such user can access the site information page and apply for ownership of the site. Before a user can claim ownership of a site is claimed, the user must agree to a set of terms and conditions of ownership. The conditions include, but are not restricted to, a condition that other users may challenge or dispute the ownership of the page.

Once ownership of the site is conferred, the user is given the ability to edit the site information page for the site such user owns. The user may provide a brief description of the site as well as public contact information. This contact information is separate from and not to be confused with the user's private contact information recorded in the registered user database. The owner may also attach the profiles of other registered users who may be related to the site. These are called "sub-profiles". Each sub-profile is assigned a role determined by the owner describing the relationship between the user in the sub-profile and the owned site. For example, if a proprietor claims ownership of a company website, the proprietor may assign sub-profile status to registered users who may be employees, suppliers, executive members, and other key roles in the organization.

A user who is the registered owner of a website may voluntarily relinquish ownership of such website. In event that ownership is relinquished, any and all information assigned to the site information page by the owner would be removed. The site would then be available for another registered user to claim ownership thereof.

Figure 10B:
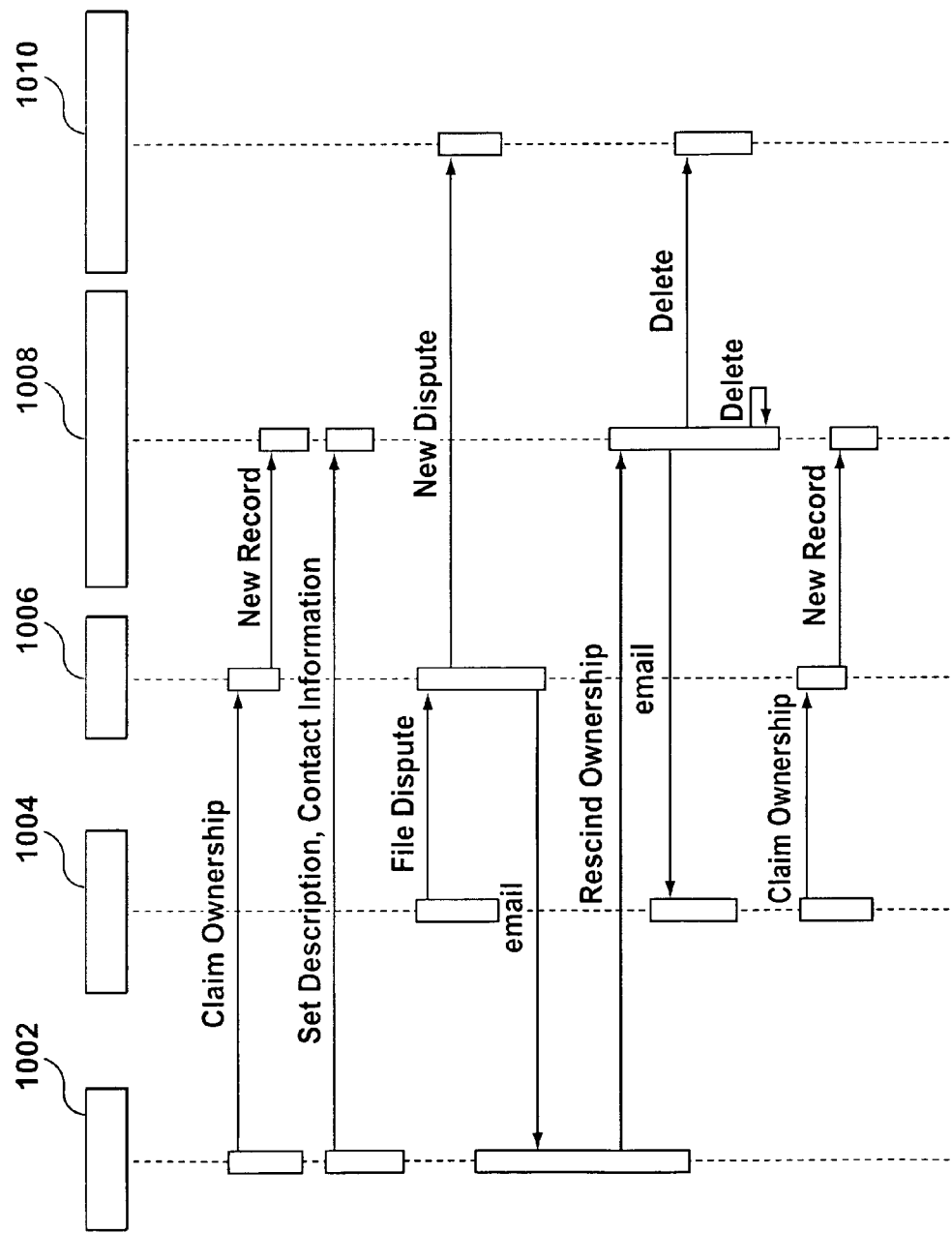
Figure 10C:
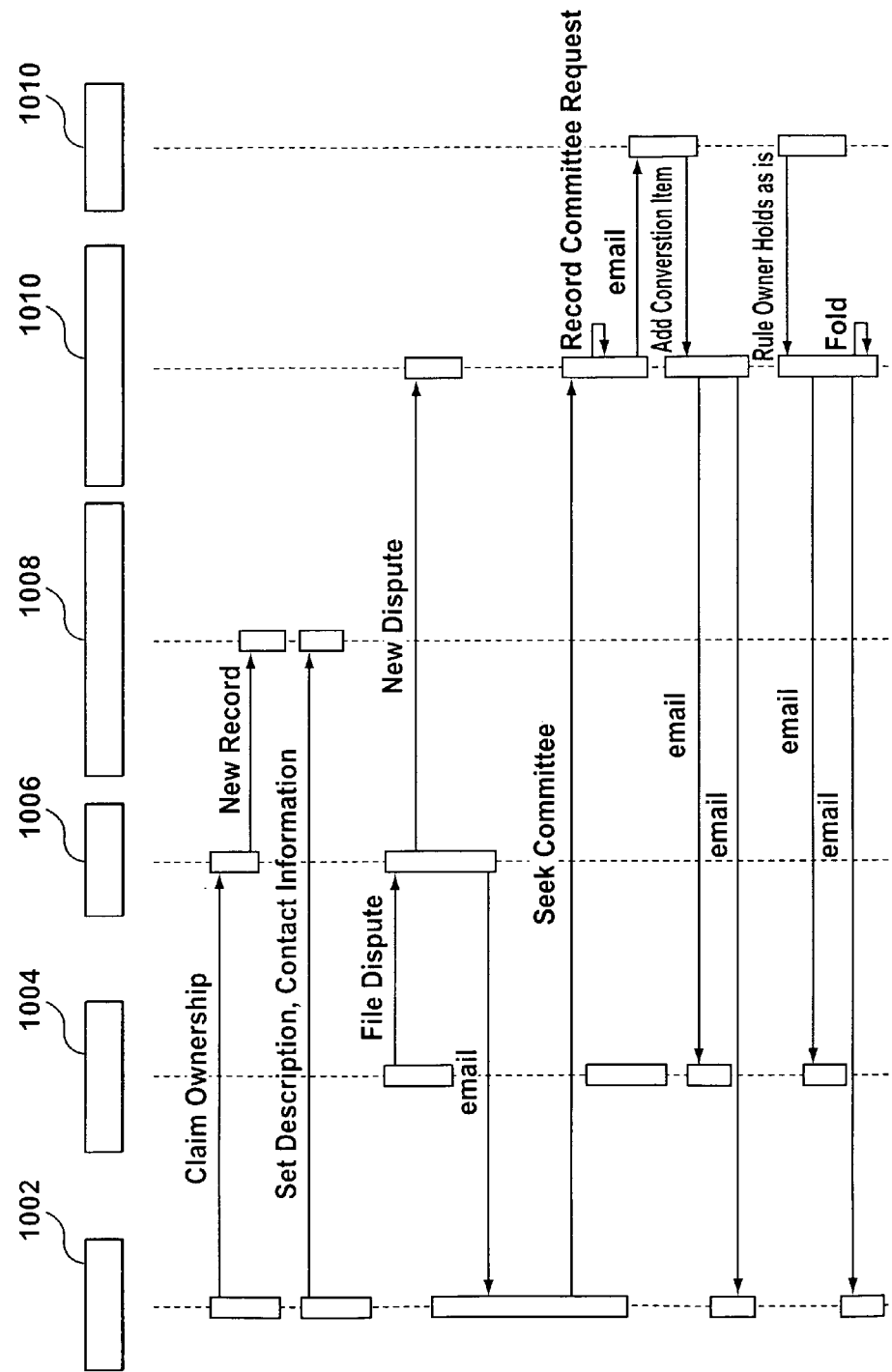

There is also provided an example dispute resolution means, as illustrated in FIGS. 10a, 10b and 10c, which are sequence diagrams depicting a timeline of events presented from top of the page to bottom of the page in chronological order. Suppose a user 1002 has claimed ownership of a site 1006 and creates a new ownership record 1008. It is possible that a second user 1004 would come across the site information page and disagree that the first user 1002 is the legitimate owner of the site 1006 in question. The site information page would provide access for the second user 1004 to initiate an ownership dispute 1010 with the original owner 1002.

When the second user 1004 initiates an ownership dispute 1010, such user will provide an initial statement as to why the dispute 1010 is being filed. Once the dispute 1010 is formally filed, the original owner 1002 is alerted via electronic mail to the presence of the dispute 1010. Also, a conversation log may be initiated, where both the original owner 1002 and the disputing user 1004 will be able to converse and negotiate a solution. Either the original owner 1002 or the disputing user 1004 may contribute to this conversation log. Any additions to the log are permanent and may not be deleted by either side. When an addition is made to the conversation log, both sides in the dispute are notified by electronic mail.

If both sides come to an agreement on the ownership of the site 1006, then the responsibility lies with both sides to rectify the ownership situation for the site 1006. If it is decided that the original owner 1002 is the legitimate owner, the disputing user 1004 can relinquish the dispute 1010 (as shown in FIG. 10a). The current owner 1002 of a site is notified via electronic mail if a dispute 1010 involving the site 1006 is folded. If it is decided that the disputing user 1004 is the correct owner, the original owner 1002 can relinquish ownership of the site (as shown in FIG. 10b), via change of the ownership record 1008. If ownership of a site 1006 is relinquished, then any disputers are notified via electronic mail.

The present invention also provides a mean for either side in an ownership dispute 1010 to request assistance of a committee 1012 (one or more overseers of the ownership process) in completing the resolution to the dispute. The invention features a limited number of reasons for involving the committee 1012 in the dispute 1010.

When the committee 1012 is requested to mediate an ownership dispute 1010, the committee 1012 is notified by electronic mail. The committee 1012 will be able to read the dispute's current conversation log. The committee may contribute statements to the dispute's conversation log. The committee may also make a ruling on who owns the site 1006. The committee 1012 may rule that the current owner 1002 is either the current owner, the disputing user 1004, or neither. If the committee 1012 rules that the disputing user 1004 is the correct owner, then the committee 1012 can transfer ownership of the site to the disputing user 1004 by changing the ownership record 1008. The committee 1012 may research internet resources such as the "whois" database in making a decision. The committee 1012 may use the conversation log in explaining a ruling. Depending on the circumstances of the dispute 1010, the current owner 1002, the disputing user 1004, or both involved in the dispute 1010 may be subject to a penalty or sanction.

While the dispute 1010 is in progress, the current owner 1002 of the site may still modify any details of the site's information page, including description, contact information, and sub-profiles.

The dispute 1010 continues until either the disputing user 1004 folds the dispute 1010 or the current owner 1002 relinquishes ownership 1008 of the site 1006, or the committee 1012 rules the dispute 1010 as over. If the committee 1012 rules on an ownership, the dispute 1010 will stay active for a period of 30 days to allow for any appeals.

Personalized Pages

In an aspect of the present invention, the search engine and associated website allows users to create personalized pages to be populated with user's selection of pre-made modules or new modules which the user have developed and created. Modules can then be shared between users. Various functionality can be integrated within each personalized module, including: news sources; weather; personal blog or diary; alerts, medical information, personal calendar; stock information; television and cinema information; horoscope; links; classified ads; address books; entertainment; games; and media players.

The search engine and associated website is operable to allow the user to select a privacy setting for a module. Modules are categories of mini-application designed to provide information, useful lookup, or enhance an application or service on the web. At least four settings are contemplated:

(i) If a page is set to "private", modules can be set to be viewed privately only.

(ii) If a page is set to "public", modules can be set to be viewed privately plus/minus by the public, signed users, critics and/or friends.

(iii) If a page is set to "signed user", modules can be set to be viewed privately plus/minus signed users, critics, and/or friends.

(iv) If a page is set to "critics or friends", modules can be set to be viewed privately plus critics and/or friends.

Call For Papers

In another aspect of the present invention, the search engine comprises a call for papers feature. After logging in, a user is able to select a "Calls for Paper" icon and then upload his/her paper, either published or unpublished to the server. Preferably, the user can choose which profession or professions his paper is applicable to.

Optionally, the paper will be located having a unique URL. The search engine of the present invention is then operable to store and crawl the contents of his/her paper. The search engine of the present invention is operable to search for users to find papers including advanced features, for example, searching by upload date, the profession paper is in, and whether it is published or unpublished. The search engine is also operable to sort the papers by citations, critics rating and/or user rating.

The papers can be linked to the user's professional biography, as mentioned above, as well as linked to the relevant university or universities. The papers can also be downloaded from the web by crawlers or by the webmasters from universities or education facilities.

Exchange of Content

The search engine and associated website may be used to exchange a wide variety of content.

Content may include text, including essays, books and other literary works; audio, including recorded music, news and speeches; video, including movies, karaoke, television shows and concerts; multimedia, including software, games, presentations and educational resources; and physical media, including merchandise, pictures, images, shopping, travel, lodgings, real estate, maps, locations and sites on maps, and artistic works. Users who wish to sell or purchase content may access the site. Creators of content may upload their works to the site for sale to others. The seller enters into a legal agreement with the search engine and website manager.

Content offered for sale is classified by the seller. The seller sets the sale price or at a price determined by the search engine and website manager and uploads or displays the content.

A buyer may search for content by title, classification, name of creator or company name. The buyer reviews legal terms of purchase. The buyer may pay for the content electronically. The buyer may download the content or receive the content via mail or delivery by various transportation methods. A buyer may rate the purchased content, and may review user ratings and critic ratings of the content.

As discussed above, users may access the search engine and associated website to retrieve content. Content retrievable on the website will have been rated by and commented on by critics and users. Critic ratings and comments may themselves be rated and commented on by users. Users may sort retrieved content by several criteria, including date of upload, user ratings, critic ratings, quantity of downloads, quantity of previews, other user-selected characteristics or any combination thereof.

It should be understood that the search engine and associated website in accordance with the present invention provides a means for new artists and creators to obtain exposure for their creations. Musicians may sell their songs on the site. Users may search for, select, listen to and download music for their personal use. Well-liked creations will accrue positive ratings, in accordance with the rating aspects of the present invention, such that the artist or creator will obtain greater relative coverage than artists with less positive feedback.

According to one as aspect of the invention, the search engine and associated website may be used to enable broadcast of music. Companies such as radio stations, restaurants, disc jockies and shopping malls may access the site and order musical playlists for broadcast. Playlists may be selected by theme, such as rock music or country music. Once purchased, the purchaser may broadcast the selected playlist at a time of their choosing over a limited time period.

Figure 11:
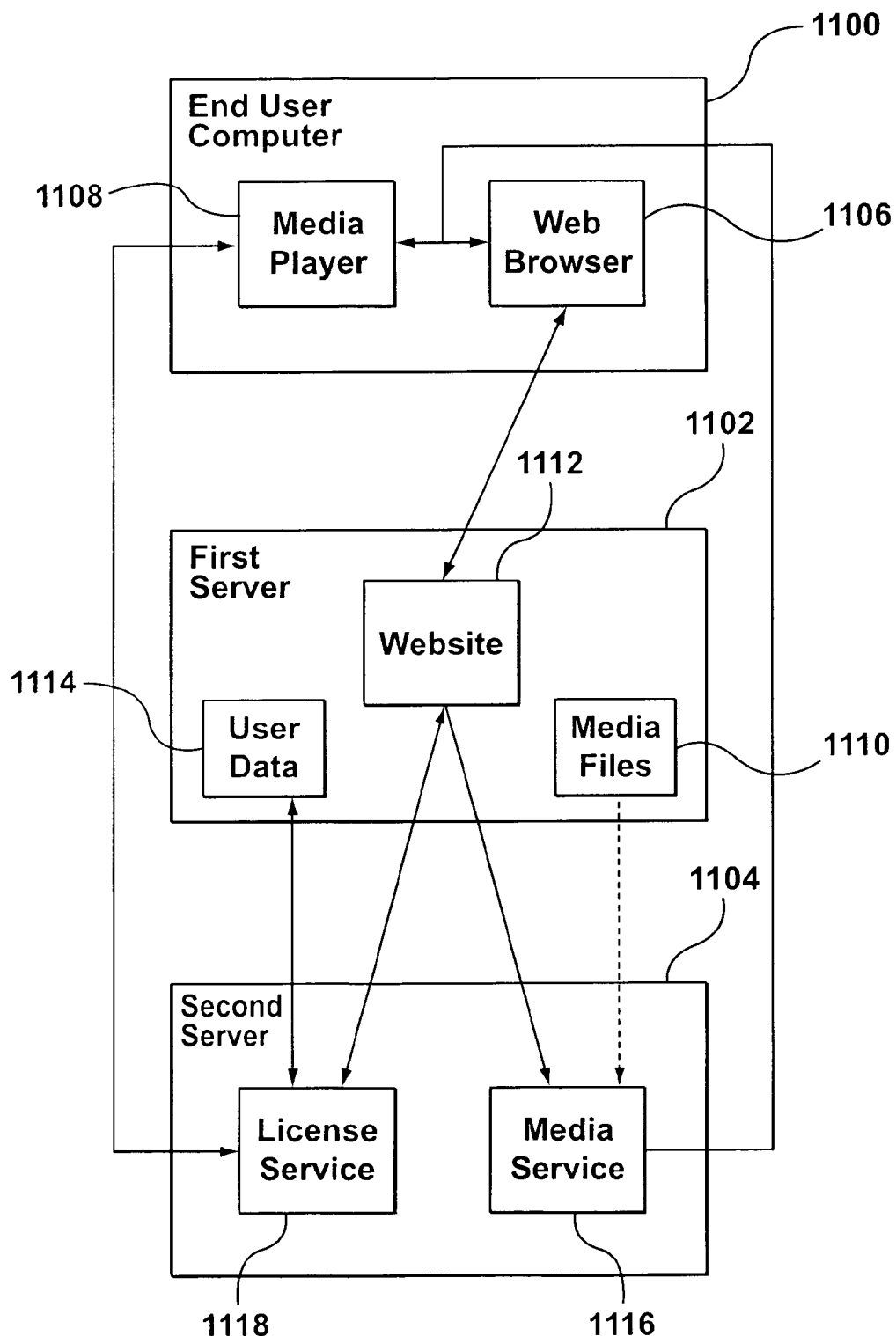
FIG. 11 illustrates a broadcast playlist feature in accordance with one aspect of the present invention.

An example of a broadcast playlist function is illustrated in FIG. 11. An end user computer 1100 comprises a web browser 1106 having a playlist and a media player 1108. The user must be connect to the internet 104 (not shown) to acquire a license and to stream content. At the end user computer 1100, an end user may use their web browser 1106 to request a song from the user's playlist maintained by the website 1112 on a first server 1102. Upon receipt of a song request, a song license request is forwarded to a license service 1118 on a second server 1104. User data 1114 is accessed by the license service 1118 to determine whether license requirements, including payment, have been met. The license is then issued. Once the license is acquired, the request is forwarded to the media service 1116 on the second server 1104. The requested song is streamed to the user's media player 1108. File sharing is used to access media files 1110 on the first server 1102. During playback of the song, pre-purchased time is decremented from the user's account. Preferably, a license is issued for a single play of the song, and a royalty charge associated with play of the song is remitted to the artist. This process may be repeated for each song in the user's playlist each time it is queued through the web browser 1106.

According to another embodiment of the search engine and website, users may access the site to access karaoke music, original music or copied music.

Figure 12:
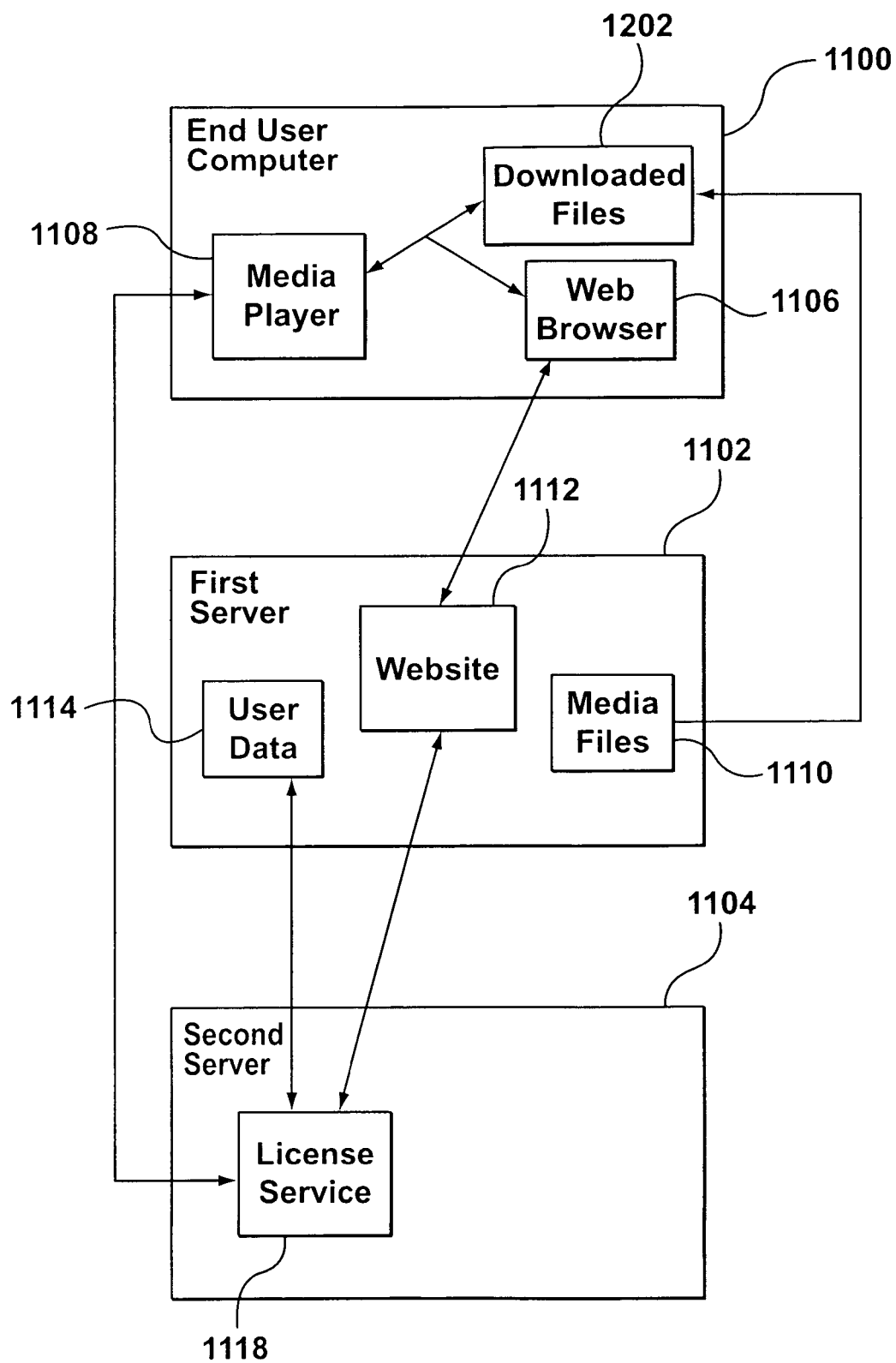
FIG. 12 illustrates a karaoke playlist and/or video news feature in accordance with one aspect of the present invention.

FIG. 12 illustrates an example of a karaoke playlist and video news function. At an end user computer 1100, an end user may request a karaoke video or video news from the website 1112 on a first server 1102. Upon receipt of a request, a license request is forwarded to a license service 1118 on a second server 1104. User data 1114 is accessed by the license service 1118 to determine whether license requirements, including payment, have been met. The license is then issued. The requested karaoke video or video news is downloaded to the user's media player 1108 and stored on the end user computer 1100 as downloaded files 1202. During playback of the karaoke video or video news, pre-purchased time is decremented from the user's account.

Figure 13:
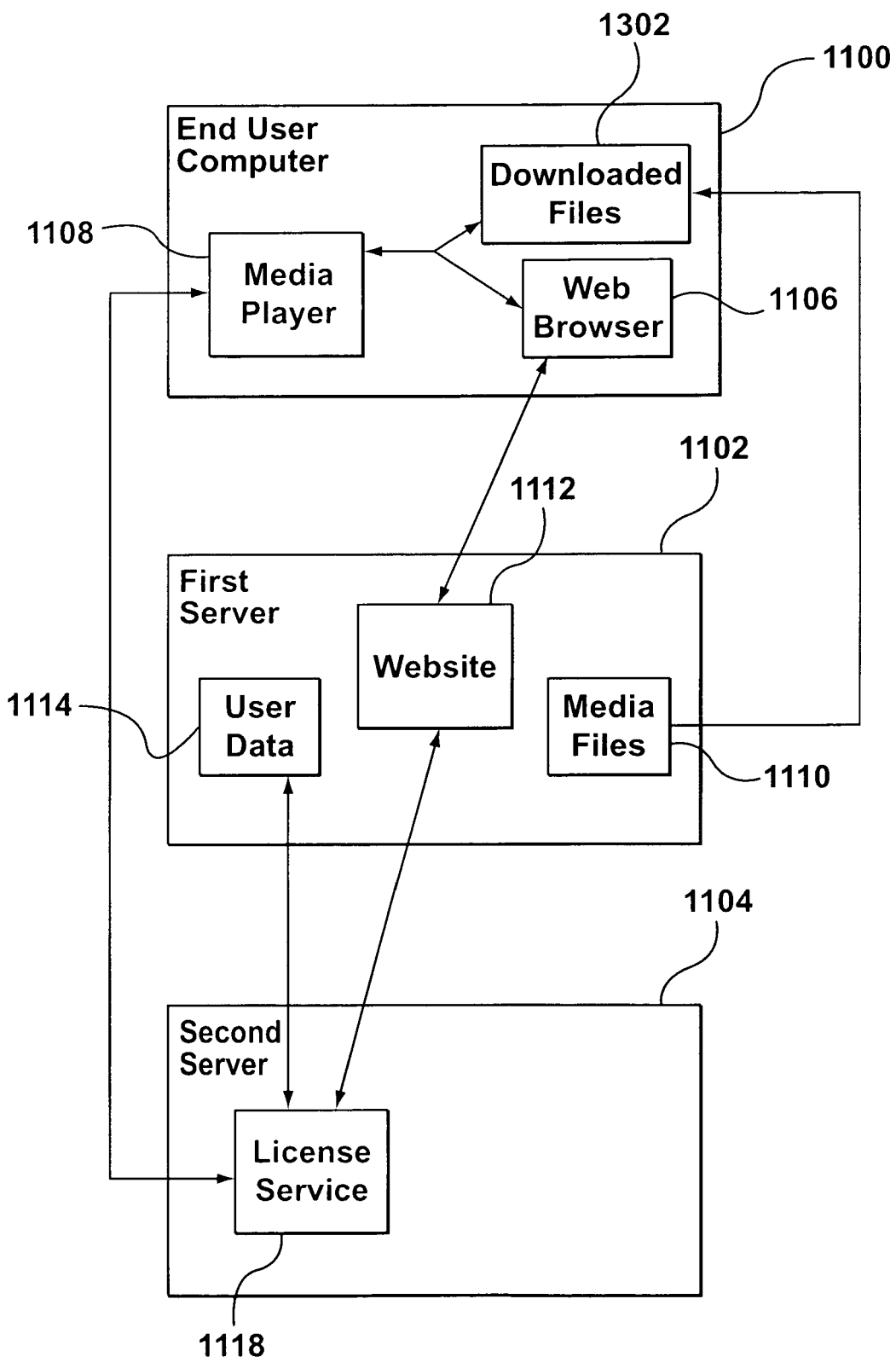
FIG. 13 illustrates a television and movie rental feature in accordance with one aspect of the present invention.

As indicated in FIG. 13, the search engine and associated website may include a television and movie rental function. At an end user computer 1100, an end user may request a television show or movie from the website 1112 on a first server 1102. Upon receipt of a request, a license request is forwarded to a license service 1118 on a second server 1104. User data 1114 is accessed by the license service 1118 to determine whether license requirements, including payment, have been met. The license is then issued. A download link is then established between the server and the end user computer. The user is then able through their web browser 1106 to download the relevant video file to the downloaded files 1302. The end user may then download the television show or movie to the end user computer for later viewing within a time limited viewing period. Upon expiry of the viewing period, the end user is provided the opportunity to pay for additional rental time.

According to another embodiment, users may access the site to view live or pre-recorded concerts. Concerts may be viewed directly over the internet, or users may view the concerts on a peripheral device such as a television or projector. Concert producers may also offer their concerts for download by others.

Figure 14:
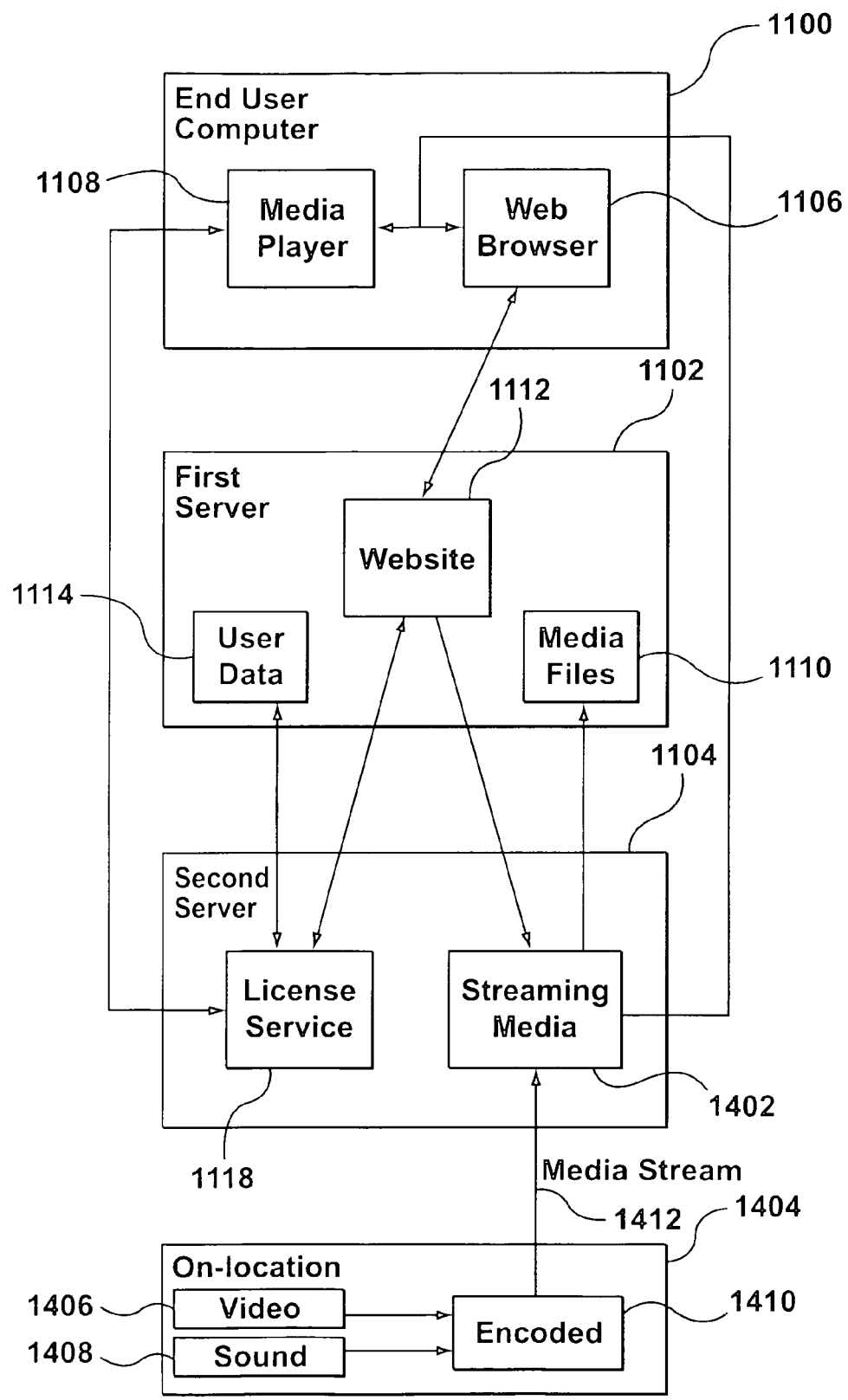
FIG. 14 illustrates a concerts and live events feature in accordance with one aspect of the present invention.

An example of a concert and live event function is illustrated in FIG. 14. At an end user computer 1100, an end user may request a concert or a live event from the website 1112. Upon receipt of a concert request, a license request is forwarded to a license service 1118 on a first server 1102. User data 1114 is accessed by the license service 1118 to determine whether license requirements, including payment, have been met. The license is then issued. The requested concert is streamed and/or downloaded to the user's media player 1108 for viewing, or for later viewing within a time limited viewing period. Upon expiry of the viewing period, the end user is provided the opportunity to pay for additional rental time. For live events, live events are recorded on video recording equipment 1406 and/or sound recording equipment 1408, and encoded 1410 into a media stream 1412 which may be streamed and downloaded to licensed end users or archived for later streaming to licensed end users.

In another embodiment, producers of video productions, including movies and television shows, may upload their video products to the site. Users may search for, select, view and download the video products.

According to another embodiment, authors of written material including poems, books, etc. may upload their products to the search engine and website. Users may search for, select, view and download the products.

According to another embodiment of the invention, the search engine and site may be used to host personal calendars. Users may enter important dates and other reminders into an on-line calendar which they may access and edit through the internet. In another embodiment, the search engine and website will provide on-line chatting, email services, and teleconferencing.

It should also be understood that the present invention is suited for offering merchandise for sale. In this aspect, creators/manufacturers of merchandise can provide online advertising of their wares. Users and critics are enabled to comment and rate the specific merchandise, for example, based either on their own experience with the actual products or based on the advertising alone, in the manner described above. Users are therefore provided with helpful and generally unbiased reviews of the merchandise, thereby allowing the user to make an informed choice.

Advertisers may also post advertisements to the search engine and site for marketing purposes and to generate revenue for the site managers. Advertising opportunities may be provided as a source of revenue.

Figure 15:
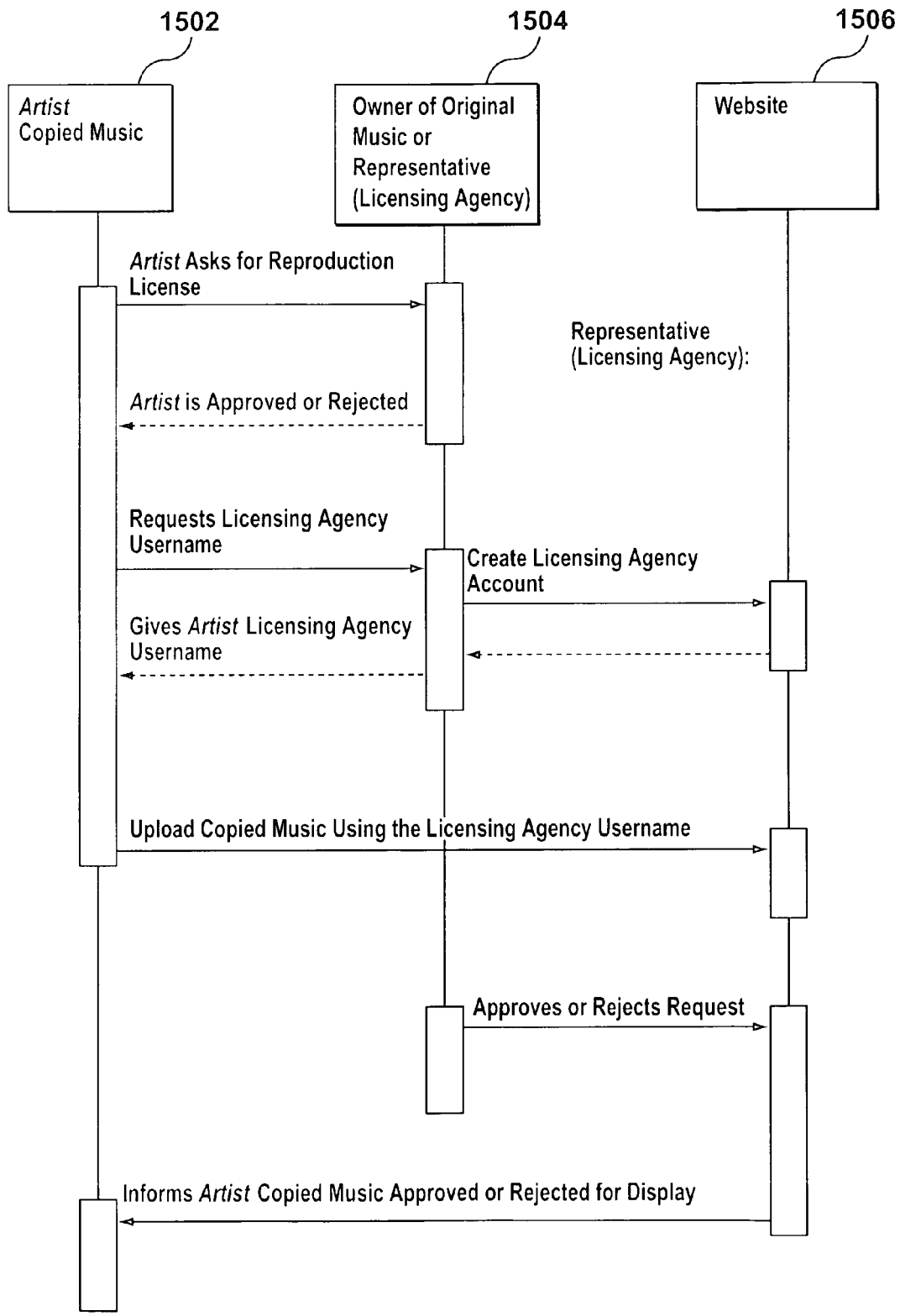
FIG. 15 is a sequence diagram illustrating an interaction between song owners and performers in accordance with one aspect of the present invention.

As illustrated in the sequence diagram FIG. 15, an artist 1502 who wishes to upload copied, or non-original, music (that they are have performed) may seek a reproduction license directly from the original music owner 1504 (either the artist or the artist's representative, or licensing agency) or may ask the original music owner to contact a website in accordance with the present invention 1506 to confirm the reproduction license. In doing so, the original music owner 1504 can create licensing agency account on the website 1506, and provide that information back to the artist 1502. Once the reproduction license is granted, the artist 1502 may upload the copied music to the website 1506 (subject to the approval of the original music owner 1504), where it is available for review and purchase by members of the public. The artist 1502 who copied the music will then receive a royalty for sales of the copied music. The original music owner 1504 may also contact the website 1506 directly to grant a reproduction license and will receive a royalty for sales of their original music.

The search engine and website may be used to promote musical, artistic or other collaboration. Individuals seeking collaborators may post information about their project to the site, including the category of their project and the type of collaboration they are seeking. Those who are seeking to collaborate on another's project may search the site for available projects. Once they identify a project on which they would like to work, they may contact the host of the project and the collaboration may proceed.

According to one embodiment of the search engine and website, critics may select their favourite content and make the content available for other users to indicate their support for their favourite content. For example, critics may indicate their favourite songs, which may then be supported by other users. Overall favourite songs may then be recognized for rewards according to a reward scheme.

News

In a further aspect of the present invention, the present invention provides a means for users and critics to post ratings and comments on news. Also, the reporter or news agency can take ownership of the news segment and put items of interest and other profiles on the ownership profile. Related links to the news segment or links to news segments by the same reporter can be searched for.

Maps

There is a map of the world with satellite images which users can access. Various locations and sites on the map can be searched for. Users and critics ratings and comments can be made on any of the locations and sites on the map or satellite images.

Students and Teachers Interaction

According to another embodiment of the invention, students and teachers may interact on the site. For example, students may ask teachers to criticize or mark their work. Teachers may post projects for students to work on. Student teacher interaction may be via text exchange, audio conferencing or videoconferencing. Accordingly, students and teachers may collaborate on projects on the site, regardless of their geographic location. For example, a student in one geographic location may obtain assistance from a teacher or another student in another part of the world through the website.

Interactive Games

According to another embodiment of the present invention, the search engine and associated website may include online interactive games which may be played by multiple users consecutively from remote locations. These games are crawled from the web or uploaded by the creators. Users and critics can post ratings and comments on the games. Also, the creator or owner can take ownership of the game and put items of interest and other profiles on the ownership profile. Related links to the games or links to games by the same owner can be searched for.

Health Management System

According to additional aspect of the present invention, the search engine and associated website is operable to support a comprehensive health management system. Users are able to establish health profiles online, which a user can login and create a health history and add, for example, laboratory and x-ray results, and also set up a health calendar for appointments, alerts and reminders. This profile is preferably only accessible to the user, but the user is able to permit certain people to access it in either read or read and write mode. Health indicators and graphs are provided to illustrate specific items of interest to the user.

Various information relating to the user can be included in the system, including: medications and allergic reactions, with links to relevant websites; manufacturers of medications, e.g., information about the medications; specific risks, e.g., for heart attack, depending on data entered; listing of surgeries with searchable description; cholesterol levels and testing; categories and explanation of diseases; specific alerts; search capabilities to locate a doctor near the user; blood test results and analysis; laboratory test results and analysis; self-examination instructions and tips, e.g., breast exams; videos of self-help information, e.g., how to do a breast examination; health tips; preventative methods, e.g., how to stop smoking or drinking; guidelines for treatment of diseases; three dimensional models characterizing various diseases, and allowing a user to personalize the model; risks for various diseases; plots of medications taken with laboratory results, e.g., insulin ingestion with blood sugar level; plots of daily diet history and calculation of the calories; different information relating to the various categories of medicine.

With respect to the three dimensional model of the human body, as mentioned a user can personalize the model depending oil the diseases he/she is interested in. The user can then click on specific parts of the model to retrieve specific information. Detailed anatomy can be visualized from the model from gross anatomy to microscopic details.

There is also provided a search function, in that users can type in their symptoms and get differential diagnosis. This is a "virtual doctor". Users can provide symptoms, and the user would be prompted for additional information, and is either text or voice activated. Users then would be provided with differential diagnosis and suggestions for further steps, e.g., tests to take or to see physicians, etc. A profile is created in accordance with what is mentioned above and then the user can update his/her symptoms over time and keep the virtual doctor aware of the changing status, laboratory test results, real doctor's opinions, etc. The virtual doctor will give advice along the way. The user can then have the illness tracked until he/she is well.

Further, as mentioned users are able to search for doctors by specialty and location. The profiles of doctors and reviews of doctors by patients and colleagues are provided.

Users are also able to search for information regarding medications and the indications and adverse effects.

Users are also able to search for the meaning of results from laboratory tests and radiology tests (MRI, CT, X-ray, Mammography, etc.).

Users are also able to search for specific information on diseases, or for the various health authorities and hospitals and access their data, or for health lines (emergency contact numbers, addresses and emails) for various areas. A map search is also provided, allowing map of location of hospital, doctors, dentists, laboratory, etc.

As mentioned above, the search engine and associated website of the present invention allows users to pose questions to experts. In the medical context, users are able to pose questions to experts in the particular field of interest in order to get valuable information to their health condition.

Notices, alerts or reminders can be posted by hospitals, or doctors in order to provide information to users in their region, e.g., flu alert. Similarly, users are able to post their concerns, to either the general public, to other users with the same problems, or to physicians or experts for answers.

Physicians can post descriptions and treatment of diseases. These descriptions can then be scanned and posted to the search engine, allowing critics to rate them. When a user searches by symptoms or disease, these posts can be provided ranked by action ranking, critic rating or user rating.

Alerts, appointments and reminders can be implemented into a calendar feature. For example, a user's cholesterol levels and testing schedule, laboratory tests, checkups, activities, e.g., exercise recommendations, etc.

The search engine and associated website also provides for the creation of graphs in response to users' entered data. For example, a plot could provide correlation of medications taken with the laboratory results, as in the case of insulin ingestion with blood sugar level, or a plot of daily diet history and calculation of the calories. Caloric intake can also be referenced with the user's expenditure of energy, e.g., the user records how long he/she exercised for and the method. The net daily energy can then be compared to his/her weight.

The user can also upload their particular medical records, including: personal information, immunization records, past medical history, medications and reactions, vitals including pulse, blood pressure, respiratory rates, temperatures, weight, height, etc.

Physical examination data can also be uploaded to the system, e.g., ears, nose and throat examinations, neck examination, chest examination, heart examination, abdomen examination, musculoskeletal system examination, etc. Users can give access to their records to the appropriate people, as mentioned above.

Users can also request specific laboratory results, e.g., x-rays, MRIs, CTs, EKGs, etc. The present invention contemplates creating unique access codes which the patient gives an administrator to obtain the x-ray or radiology information.

The search engine and associated website allows users to print various part of the health profile. This information can be printed to take to a family doctor or specialist when needed.

Figure 16:
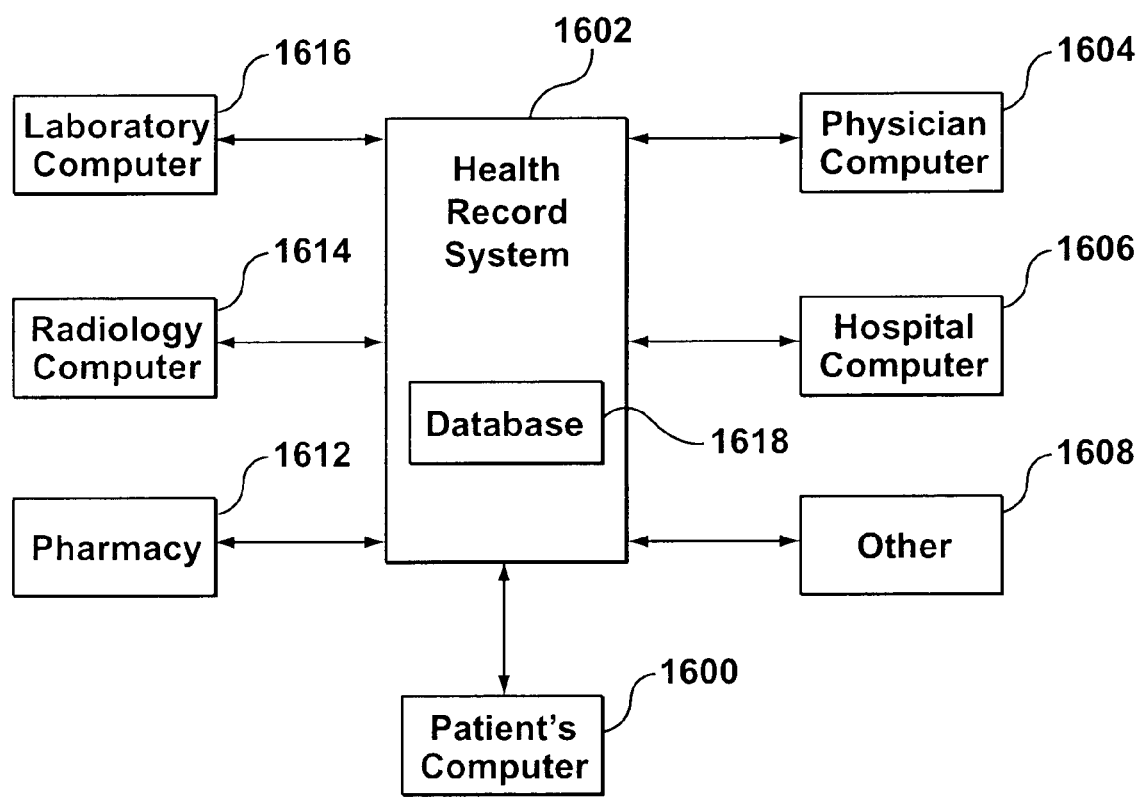
FIG. 16 illustrates a health management system in accordance with one particular aspect of the present invention.

As an example, the configuration of a health record system in accordance with the present invention is illustrated in FIG. 16. The health record system 1602 comprises a patient's personal health records as entered via a website in accordance with the present invention. These records are stored within a database 1618. The data is entered to the health record system 1602 by the patient through their own personal computer 1600. The data may also be stored in the patient's personal computer 1600. It should be understood that the patient can transfer medical records to the database 1618 of the health record system 1602 in order to provide the records for others to access, as well as to provide for depository of health information for their own purposes.

Linked to the health record system 1602 are one or more physicians' computers 1604, preferably the patient's personal physician. The physician can login and access the patient's records through stored in the database 1618. The physician can either read the records or optionally write information, depending on whether permission is granted by the patient. The physician is granted access to the patient's records on the health record system 1602 via an access code that is provided by the patient to the physician.

Further, health authority/hospital computers 1606 are also linked to the health record system 1602. The also are granted access to the patient's medical records via an access code, and may read or write depending on the permissions granted by the patient.

Optionally, other computers 1608 may be linked to the health record system. For example, family members with an interest in the patient's health records may be provided with access to the records in the same manner as for physicians and hospitals described above.

One or more laboratory computers 1616 can be connected to the health record system 1602. In this way, a laboratory is enabled to upload a patient's lab results directly to the patient's health records. The patient can request this service by providing the access code.

Similarly, one or more radiology computers 1614 may be connected to the health record system 1602, Such that the patient can request that the radiology facility upload his/her x-ray results to the database 1618 of the health record system 1602.

In addition, one or more pharmacy computers 1612 may be connected to the health record system 1602, such that the patient can request that the pharmacy provide specific information to his/her records in the database 1618 of the health record system 1602. For example, information regarding prescriptions can be provided directly to the health record system 1602.

The health management system in accordance with the present invention enables users to control and participate in their own health, which advantageously changes the way health care is delivered.

It will be appreciated by those skilled in the art that other variations of the preferred embodiment may also be practised without departing from the scope of the invention.

What is claimed is:

1. A method for rating online content, the method comprising:
   (a) providing a search engine operable on a server computer to enable users on one or more computers to access the online content, and collecting from the users first feedback information relating to the online content;
   (b) qualifying users to become critics in accordance with selected criteria by other critics;
   (c) collecting from the critics second feedback information in association with the online content;
   (d) compiling the first feedback information and the second feedback information on the server computer to generate one or more ratings; and
   (e) the search engine displaying the one or more ratings in association with the online content.

2. The method of claim 1 further comprising:
   (a) collecting from the users first critic feedback information and the critics second critic feedback information in association with a particular critic;
   (b) compiling the first critic feedback information and the second critic feedback information to generate a rating for the particular critic; and
   (c) revoking the critic status of the particular critic if the rating for the particular critic is lower than a critic standard rating.

3. The method of claim 1 wherein the search engine also displays the first feedback information and the second feedback information in association with the online content.

4. The method of claim 3 further comprising providing a follow-up means whereby follow-up information is collected from the users and the critics in association with either the first feedback information or the second feedback information, the search engine displaying the follow-up information in association with the online content.

5. The method of claim 1 wherein the search engine sorts the online content and associated rating according to attributes of the content.

6. The method of claim 1 wherein the critics form critic groups based on common attributes.

7. The method of claim 1 further comprising providing an ownership function, whereby the users or the critics establish a record of ownership in association with the online content.

8. The method of claim 1 whereby the online content comprises a proposal for a project, with the search engine displaying the first feedback information and the second feedback information in association with the proposal for a project.

9. The method of claim 1 whereby the online content comprises a question posed by the user, with the search engine displaying the first feedback information and the second feedback information in association with the question.

10. The method of claim 1 further comprising establishing personalized modules for the critics.

11. The method of claim 1 further comprising providing a means for sale of online content.

12. The method of claim 11 wherein the online content includes audio or video and the means for sale enables the users to purchase a pre-determined amount of time of access to the audio or video.

13. The method of claim 12 wherein the online content is provided to the users through a website supported by a first server, the first server comprising data associated with the users.

14. The method of claim 13 wherein a license associated with the online content is issued to the users from a second server, the license enabling the users to access the online content.

15. A system for rating online content, the system being operable to connect to one or more computers to provide access to the resources of the system at said one or more computers, the system comprising:
   (a) a server computer; and
   (b) a server application linked to the server computer, the server application including a search engine, the server application being operable to provide instructions to the server computer that:
      (i) provides a search engine to enable users to access the online content, and collects from the users first feedback information relating to the online content;
      (ii) qualifies users to become critics in accordance with selected criteria by other critics;
      (iii) collects from the critics second feedback information in association with the online content; and
      (iv) compiles the first feedback information and the second feedback information to generate one or more ratings;
   wherein the search engine sorts the online content and provides the users with the first feedback information, the second feedback information and the one or more ratings.

16. The system of claim 15 wherein the server application comprises a critic feedback function that comprises:
   (a) collecting from the users first critic feedback information and the critics second critic feedback information in association with a particular critic;
   (b) compiling the first critic feedback information and the second critic feedback information to generate a rating for the particular critic; and
   (c) revoking the critic status of the particular critic if the rating for the particular critic is lower than a critic standard rating.

17. The system of claim 15 whereby the online content is offered for sale to the users.

18. The system of claim 17 whereby the online content includes audio or video and the means for sale enables the users to purchase a pre-determined amount of time of access to the audio or video.

19. The system of claim 18 wherein the online content is provided to the users through a website supported by a first server, the first server comprising data associated with the users.

20. The system of claim 19 wherein a license associated with the online content is issued to the users from a second server, the license enabling the users to access the online content.

21. A computer program product for use on a server computer, the computer program product comprising:
   (a) a computer usable medium; and
   (b) computer readable program code recorded or storable in the computer useable medium, the computer readable program code defining a server application on the server computer, that is operable on the server computer to:

(i) provide a search engine to enable users to access the online content, and collect from the users first feedback information relating to the online content;
(ii) qualify users to become critics in accordance with selected criteria;
(iii) collect from the critics second feedback information in association with online content;
(iv) compile the first feedback information and the second feedback information to generate one or more ratings; and
(v) enable a search engine to provide users access to the online content and the one or more ratings.

22. The computer program product of claim 21 wherein the server application also comprises a critic integrity feature, a critic feedback feature including the steps of:
  (a) collecting from the users first critic feedback information and the critics second critic feedback information in association with a particular critic;
  (b) compiling the first critic feedback information and the second critic feedback information to generate a rating for the particular critic; and
  (c) revoking the critic status of the particular critic if the rating for the particular critic is lower than a critic standard rating.

* * * * *